(12) United States Patent
Krajancich

(10) Patent No.: US 11,466,640 B2
(45) Date of Patent: Oct. 11, 2022

(54) COMBUSTION ENGINE

(71) Applicant: James Domenic Krajancich, Hazelmere (AU)

(72) Inventor: James Domenic Krajancich, Hazelmere (AU)

( * ) Notice: Subject to any disclaimer, the term of this patent is extended or adjusted under 35 U.S.C. 154(b) by 0 days.

(21) Appl. No.: 17/282,264

(22) PCT Filed: Sep. 27, 2019

(86) PCT No.: PCT/AU2019/000123
§ 371 (c)(1),
(2) Date: Apr. 1, 2021

(87) PCT Pub. No.: WO2020/069554
PCT Pub. Date: Apr. 9, 2020

(65) Prior Publication Data
US 2021/0340930 A1    Nov. 4, 2021

(30) Foreign Application Priority Data

Oct. 5, 2018   (AU) .................... 2018903771

(51) Int. Cl.
*F02D 41/38*      (2006.01)
*F01L 1/047*      (2006.01)
*F01L 1/34*       (2006.01)
*F01L 1/46*       (2006.01)
*F01L 5/04*       (2006.01)
*F02B 75/02*      (2006.01)
*F02D 13/02*      (2006.01)

(52) U.S. Cl.
CPC .............. *F02D 41/38* (2013.01); *F01L 1/047* (2013.01); *F01L 1/34* (2013.01); *F01L 1/462* (2013.01); *F01L 5/04* (2013.01); *F02B 75/02* (2013.01); *F02D 13/0249* (2013.01); *F02B 2075/027* (2013.01); *F02D 2041/389* (2013.01)

(58) Field of Classification Search
CPC ..... F01L 5/04; F01L 1/462; F01L 1/34; F01L 1/047; F02B 75/02; F02D 41/38
See application file for complete search history.

(56) References Cited

U.S. PATENT DOCUMENTS 7,464,675 B1 * 12/2008 Schechter ............... F01B 17/02
123/90.15

* cited by examiner

Primary Examiner — Kevin A Lathers
(74) Attorney, Agent, or Firm — Martin IP Law Group; C. Richard Martin

(57) ABSTRACT

A four-stroke internal combustion engine comprising an inlet cam configured to open and close an inlet valve, a No. 1 exhaust cam configured to open and close an exhaust valve, a No. 2 exhaust cam configured to open and close the same exhaust valve, wherein the No. 2 exhaust cam is angularly adjustable relative to the No. 1 exhaust cam in response to input from an operator, so that the No. 2 exhaust cam is able to be selectively engaged; wherein the No. 1 exhaust cam is configured to open and close the exhaust valve during the compression stroke, so that a selected quantity of air drawn in during the intake stroke is expelled during the compression stroke; and wherein the No. 2 exhaust cam is configured to optionally close the exhaust valve when engaged.

20 Claims, 23 Drawing Sheets

COMBUSTION ENGINE

FIELD OF THE INVENTION

The present invention relates to an improved internal combustion engine. In particular relating to improved cam and valve arrangement for a four-stroke internal combustion engine.

BACKGROUND

Four stroke internal combustion engines of conventional type comprise a combustion chamber having a piston mounted therein to be reciprocal between a first position in which the combustion chamber is of maximum volume and a second position in which the combustion chamber is of minimum volume. The piston sealingly engages with the walls of the combustion chamber.

Engine power output is controlled by the operator controlling the amount of air and fuel entering the engine by "throttling" the air permitted to enter the engine, which in turn adjusts the volume of fuel being mixed with that air. Small throttle openings provide low power outputs and large throttle openings provide high power outputs.

Essentially, a volume of air is drawn into the combustion chamber during the intake stroke, approximately equal to the displacement of the piston. The air is then compressed during the subsequent compression stroke, and a measured quantity of fuel is injected at a point during the compression stroke, so that a charge of combustible mixture is contained at pressure in the combustion chamber.

The charge of combustible material, is ignited by a spark plug. This is done at or adjacent the piston in the second position of the piston. This causes combustion of the charge of combustible mixture charge and the production of hot combustion gases which expand rapidly and apply force to the piston. This force pushes the piston back towards its first position, the motion being defined as the combustion stroke. The piston is used to exhaust the spent combustible mixture from the combustion chamber during the subsequent exhaust stroke.

To admit air into the combustion chamber, and to exhaust the spent combustible mixture from the combustion chamber, the combustion chamber contains valves. Typically this involves an inlet valve and an exhaust valve in the case of a four-stroke engine, or multiples of each, provided with an actuating mechanism arranged to cause the valves to open and close at appropriate points in the cycle of the engine.

A cam arrangement is traditionally used as the actuating mechanism, involving at least one cam mounted on a rotating camshaft, to drive the valves toward the open or closed position, whereby the angular position (or timing) of the cams is used to determine the times at which the valves may open and closed during each stroke.

Variable valve timing is known, where the angular position of a cam on the camshaft determines the point during the cycle at which the cam engages with a valve, and therefore at which point the valve may be opened or closed.

A number of mechanisms exist to alter the timing of the valves, where the timing may be adjusted according to the demands of the engine, so the behaviour is altered depending on the power requirements.

One common means of varying the timing of the valve opening and closing is by using a pair of cams, which are angularly adjustable relative to one another, to provide alternative opening and closing times of the valve associated with the cams.

The engine is configured to optionally select which of these cams is used to open the valve, thus providing a means to alter the timing of the valve.

The angle at which the two cams are disposed relative to one another has the effect of altering time at which a valve may be opened or closed.

Alternatively the duration for which a valve may be altered, where the two cams are adjusted to work in unison, and the combination of the two cams provides an extended portion with which the valve can be opened.

For example, in a four-stroke engine the inlet valve and the exhaust valve are at some point in the cycle, both open at the same time. This is known as valve overlap and is necessary to achieve an economic degree of charge of combustible mixture into the combustion chamber while exhausting spent combustible mixture at a high rate of engine revolutions. However, it is found that this valve overlap causes a part of the fresh charge of fuel to pass directly out of the exhaust valve means. This causes the exhaust gasses to contain more unspent hydrocarbons than is necessary.

The duration of the valve overlap is commonly the focus of conventional mechanisms of variable valve timing, as less overlap may be beneficial for low speed applications, whereas more overlap is beneficial for higher power requirements.

However, variable valve timing mechanisms all still follow the conventional pattern of opening and closing the valve in a particular order, with variations on the timing of these events.

For example it is conventional that during the intake stroke the inlet valve is open, and the exhaust valve closed, to allow cooler ambient air to be drawn into the chamber.

During the compression stroke both the inlet valve and the exhaust valve are conventionally closed, to allow the drawn in air to be compressed.

The ignition causes the piston to be forced downwardly during the combustion stroke, with both the inlet valve and exhaust valve remaining closed for the majority of the stroke.

Finally the exhaust stroke is completed with the inlet valve closed and the exhaust valve opened, to allow the combusted gases to be expelled through the exhaust system.

The passage of hot exhaust gasses past the exhaust valve means causes the exhaust valve to become hot in use. This leads to an increase in nitrogen oxide content of the exhaust gasses.

Thus, high operating temperature contributes to undesirable emissions from the engine.

Furthermore, higher operating temperatures are undesirable for other reasons, not least the functionality of the engine as a whole, and the capability of components to perform as required. For example, components such as engine oil and seals may degrade more rapidly due to higher temperatures.

The combustion cycle can function efficiently where the air can be drawn into, and expelled from, the combustion chamber with minimal resistance. Thus, a valve which restricts airflow when in the open position is undesirable.

Restricted airflow means that the force required by the piston to draw air in and to expel exhaust air is greater, resulting in less power being available to provide to the drive shaft.

Valves are typically poppet valves, which are biased away from the combustion chamber by a spring, such that they are seated in the closed position unless a force is used to drive them into the open position.

The use of poppet valves has a number of limitations.

One inherent problem with poppet valves is that the throat, or aperture, through which air passes, is restricted partially by the valve itself, which moves along an axis coincident with the centre of the aperture.

Also, if it is desired to use high compression ratios for increased efficiencies, the hot exhaust valve means can cause detonation of the charge independently of the ignition means.

This is extremely damaging to engine components and leads to a drop-in efficiency, detonation which occurs without the ignition provided by the spark plug is known as auto-ignition.

A higher compression ratio can be desirable to achieve a greater total burn of fuel, and therefore reduce emissions and increase efficiency, although the increased pressure resulting from the higher compression ratio is a contributing factor to auto-ignition.

Additionally, it is known that when inefficient combustion takes place and, as a result, organic compounds such as hydrocarbons in the combustible mixture only burn partially, the carbon monoxide content of the exhaust gases increases. This is typically undesirable.

The present invention attempts to overcome at least in part the aforementioned disadvantages of previous internal combustion engines by providing an engine having cam arrangements capable of providing a cooler operating environment under certain conditions, and valves capable of working at increased compression ratios with reduced likelihood of auto-ignition, and/or able to provide increased airflow in and out of the combustion chamber.

SUMMARY OF THE INVENTION

In accordance with one aspect of the present invention there is provided a four-stroke internal combustion engine comprising:
- a combustion chamber;
- a piston mounted within the combustion chamber and configured to be sealingly engaged with walls of the combustion chamber, the piston being arranged for reciprocating motion along an axis between a first position in which the combustion chamber is of maximum volume and a second position in which the combustion chamber is of minimum volume;
- wherein the piston completes four strokes during a cycle, the strokes defined as intake stroke, compression stroke, combustion stroke and exhaust stroke;
- a fuel injection means in a region of the combustion chamber within the minimum volume defined by the piston in its second position;
- a cylinder head comprising;
  - an ignition means;
  - an inlet cam configured to open and close an inlet valve;
  - a No. 1 exhaust cam configured to open and close an exhaust valve;
  - a No. 2 exhaust cam configured to open and close the same exhaust valve;
  - and wherein the No. 2 exhaust cam is angularly adjustable relative to the No. 1 exhaust cam in response to input from an operator, so that the No. 2 exhaust cam is able to be selectively engaged;
  - wherein the No. 1 exhaust cam is configured to open and close the exhaust valve during the compression stroke, so that a selected quantity of air drawn in during the intake stroke is expelled during the compression stroke;
  - wherein the No. 2 exhaust cam is configured to optionally close the exhaust valve when engaged; and
  - wherein the fuel injection means is configured to adjust a quantity of fuel injected in accordance with the quantity of air retained during the compression stroke.

Preferably, the inlet cam is keyed to an inlet cam shaft.

Preferably, the No. 1 exhaust cam is keyed to an exhaust cam shaft.

Preferably, the No. 2 exhaust cam is rotatable around the axis of the exhaust cam shaft.

Preferably, the inlet valve and exhaust valve are piston valves.

Preferably, the engine comprises a No. 2 exhaust-cam-drive-gear keyed to a control shaft; wherein the No. 2 exhaust-cam-drive-gear engages with a No. 2 exhaust-cam-driven-gear keyed to the No. 2 exhaust cam.

Preferably, the engine further comprises a power-control-drive-gear having an axis parallel to, and coincident with, the exhaust cam shaft, and configured to engage with a power-control-driven-gear keyed to the control shaft; wherein the power-control-drive-gear is moveable along its axis in response to input from an operator.

Preferably, angular adjustment of the No. 2 exhaust cam relative to the No. 1 exhaust cam is achieved using an angular adjustment mechanism, configured to enable angular adjustment of the power-control-drive-gear in relation to the main exhaust cam shaft, upon axial movement of the power-control-drive-gear; wherein axial movement of the power-control-drive-gear results in angular adjustment of the No. 2 exhaust cam relative to the No. 1 exhaust cam, so that the duration for which the exhaust valve remains open or closed may be adjusted in accordance with input from the operator.

The angular adjustment mechanism may comprise helical grooves engaging with caged ball bearings.

Preferably, the inlet valve is configured to sealingly engage with an inlet valve sleeve and an exhaust valve configured to sealingly engage with an exhaust valve sleeve Preferably, the inlet valve and the exhaust valve are arranged for reciprocating motion between a closed position and an open position.

Preferably, the inlet valve is arranged to provide a fluid flow path from an inlet port to the combustion chamber when in the open position; and is arranged to cover the inlet port, thus preventing flow, when in the closed position; and the exhaust valve is arranged to provide a fluid flow path from an exhaust port to the combustion chamber when in the open position; and is arranged to cover the exhaust port, thus preventing flow, when in the closed position.

Preferably, the inlet valve and the exhaust valve are biased toward their respective open positions.

Preferably, the inlet valve and the exhaust valve are each biased using a valve spring.

Preferably, the valve spring is located inside the valve.

Preferably, the valve spring is retained using a valve spring anchor.

Preferably, the valve spring anchor is a Y or wishbone shape, so that the anchoring of the valve spring does not impede the cams and cam shafts.

Preferably, the inlet port is arranged to direct airflow toward the exhaust valve when in the open position, so that the exhaust valve is cooled by air entering the inlet port.

Preferably, the inlet valve sleeve comprises an aperture in a wall of the inlet valve sleeve to allow fluid flow between the inlet port and the combustion chamber.

Preferably, the aperture in the wall of the inlet valve sleeve is shaped to direct fluid flow from the inlet port toward the exhaust piston valve.

Preferably, the exhaust valve sleeve comprises an aperture in a wall of the exhaust valve sleeve to allow fluid flow between the combustion chamber and the exhaust port.

Preferably, the aperture in the wall of the exhaust valve sleeve is shaped to direct fluid flow from the combustion chamber toward the exhaust port.

Preferably, the inlet valves sleeve and exhaust valve sleeve both comprise engagement features, the engagement features configured to allow only minimal axial movement of the inlet valve sleeve and exhaust valve sleeve within the cylinder head.

Preferably, the engagement features comprise dampers mounted within recesses in the walls of the inlet valve sleeve and exhaust valve sleeve.

Preferably, the dampers are configured to be compressed to enable installation of the inlet valve sleeve and exhaust valve sleeve into the cylinder head, and to impart a radial force onto the cylinder head once installed, to control movement of the inlet valve sleeve and exhaust valve sleeve within the cylinder head.

Preferably, the inlet valve and exhaust valve are disposed opposite each other and have a radial direction of movement with respect to the axis of the piston.

Preferably, the inlet valve and exhaust valve are hollow, having the biasing means located within the hollow.

BRIEF DESCRIPTION OF DRAWINGS

The present invention will now be described, by way of example, with reference to the accompanying drawings, in which.

Figure 1:
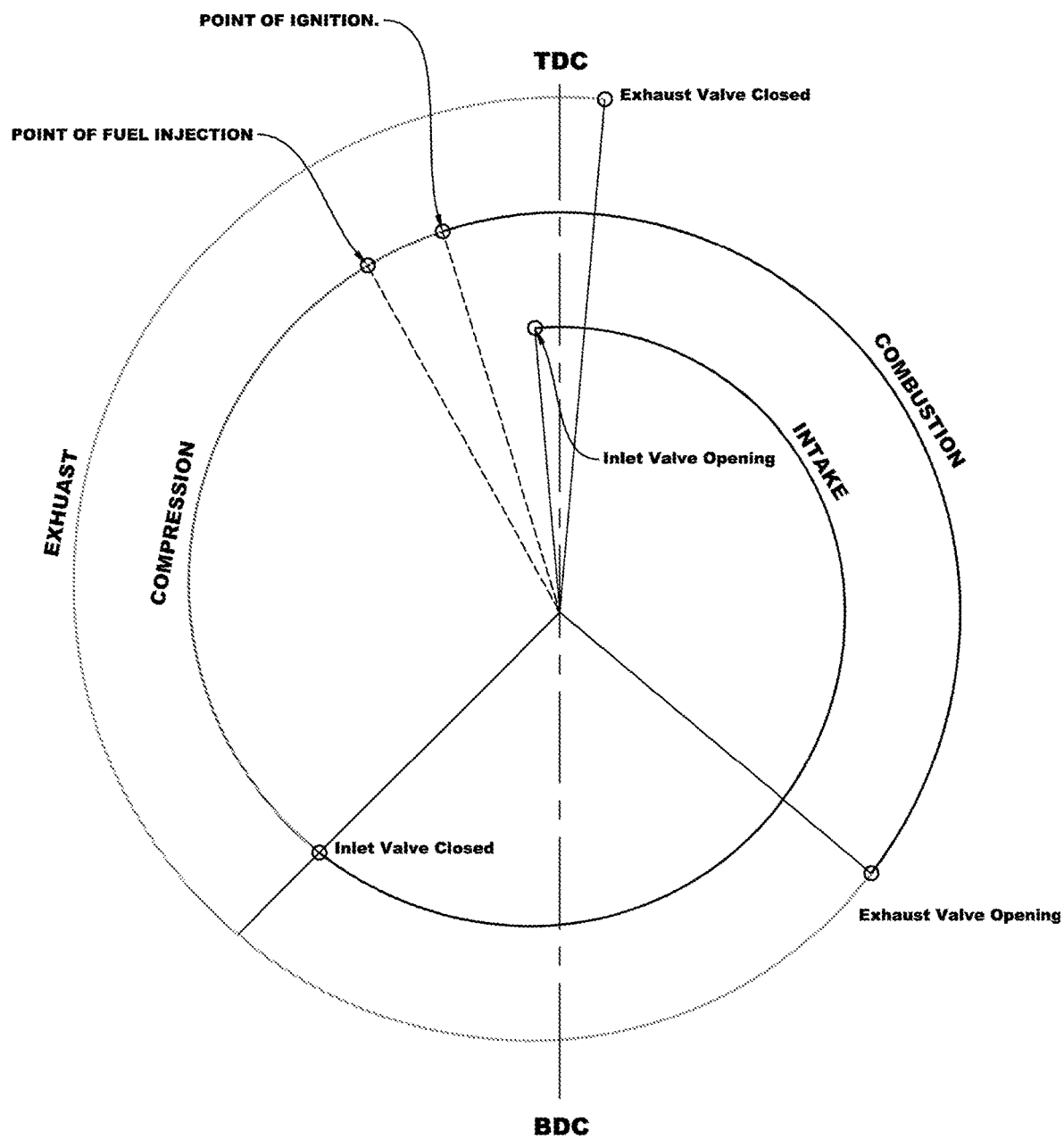
FIG. 1 is a valve timing diagram showing a conventional timing arrangement known in the art, where the approximate timing of the open and close events of the inlet valve and exhaust valve are shown with respect to each of the four strokes of the piston.

The description refers to the No. 2 exhaust cam 12 being engaged, not engaged, or partially engaged, where engaged is used to indicate that the No. 2 exhaust cam 12 is positioned relative to the No. 1 exhaust cam 13 in a manner that prevents the exhaust valve 16 from opening during the compression stroke.

Not engaged is used to indicate that the No. 2 exhaust cam 12 is positioned relative to the No. 1 exhaust cam 13 in a manner which does not act upon the exhaust valve 16, so that the No. 1 exhaust cam 13 allows the exhaust valve 16 to open for a period during the compression stroke.

Partially engaged is used to indicate that the No. 2 exhaust cam 12 is positioned relative to the No. 1 exhaust cam 13 in a manner which allows the exhaust valve 16 to open for a shorter period during the compression stroke that where the No. 2 exhaust cam 12 is not engaged.

Throughout the description, the following nomenclature shall be used, not all integers are described:
1) Internal Combustion Engine
4) Exhaust Cam Shaft
5) Inlet Cam Shaft
6) Power-Control-Drive-Gear
7) Power-Control-Driven-Gear
8) Control Shaft
9) No. 2 exhaust-cam-drive-gear
10) Cylinder Head
11) No. 2 exhaust-cam-driven-gear
12) No. 2 Exhaust Cam
13) No. 1 Exhaust Cam
14) Valve Spring Anchor
15) Follower Pin
16) Exhaust Valve
18) Exhaust Valve Sleeve
19) Inlet Valve Sleeve
20) Inlet Valve
21) Valve Springs
24) Inlet Cam
25) Combustion Chamber
26) Inlet Port
27) Exhaust Port
29) Piston
30) Connecting Rod
31) Crank Pin
32) Cylinder Block
33) Power Control Lever (Throttle)
34) Fuel Injector
35) Ignition means
40) Exhaust Valve Sleeve Damper
41) Inlet Valve Sleeve Damper
42) Valve Circlip
43) Valve Collet

DESCRIPTION OF PREFERRED EMBODIMENTS

Referring to the figures, there is shown a four-stroke internal combustion engine 1 comprising:
a combustion chamber 25;

a piston 29 mounted within the combustion chamber 25 and configured to be sealingly engaged with walls of the combustion chamber 25, the piston 29 being arranged for reciprocating motion along an axis between a first position in which the combustion chamber 25 is of maximum volume and a second position in which the combustion chamber 25 is of minimum volume;

wherein the piston 29 completes four strokes during a cycle, the strokes defined as intake stroke, compression stroke, combustion stroke and exhaust stroke;

a fuel injector 34 in a region of the combustion chamber 25 within the minimum volume defined by the piston 29 in its second position;

a cylinder head 10 comprising;
  an ignition means 35;
  an inlet cam 24 configured to open and close an inlet valve 20;
  a No. 1 exhaust cam 13 configured to open and close an exhaust valve 16;
  a No. 2 exhaust cam 12 configured open and close the same exhaust valve 16;
  and wherein the No. 2 exhaust cam 12 is angularly adjustable relative to the No. 1 exhaust cam 13 in response to input from an operator, so that the No. 2 exhaust cam 12 is able to be selectively engaged;
  wherein the No. 1 exhaust cam 13 is configured to open and close the exhaust valve 16 during the compression cycle, so that a selected quantity of air drawn in during the intake stroke is expelled during the compression stroke;
  wherein the No. 2 exhaust came 12 is configured to optionally close the exhaust valve 16 when engaged; and
  wherein the fuel injector 34 is configured to adjust a quantity of fuel injected in accordance with the quantity of air expelled during the compression stroke.

The inlet cam 24 may be keyed to an inlet cam shaft 5.

The No. 1 exhaust cam 13 may be keyed to an exhaust cam shaft 4.

The No. 2 exhaust cam 12 may be rotatable around the axis of the exhaust cam shaft 4.

The inlet valve 20 and the exhaust valve 16 may both be piston valves.

The engine 1 may comprise a No. 2 exhaust-cam-drive-gear 9 keyed to a control shaft 8; wherein the No. 2 exhaust-cam-drive-gear 9 engages with a No. 2 exhaust-cam-driven-gear 11 keyed to the No. 2 exhaust cam 12.

The engine 1 may further comprise a power-control-drive-gear 6 having an axis parallel to, and coincident with, the exhaust cam shaft 4, and configured to engage with a power-control-driven-gear 7 keyed to the control shaft 8; wherein the power-control-drive-gear 6 is moveable along its axis in response to input from an operator.

Angular adjustment of the No. 2 exhaust cam 12 relative to the No. 1 exhaust cam 13 may be achieved using an angular adjustment mechanism, configured to enable angular adjustment of the power-control-drive-gear 6 in relation to the exhaust cam shaft 4, upon axial movement of the power-control-drive-gear 6; wherein axial movement of the power-control-drive-gear 6 results in angular adjustment of the power-control-driven-gear 7 and therefore the power control shaft 8, so that the duration for which the exhaust piston valve 16 remains open or closed may be adjusted in accordance with input from the operator.

The angular adjustment mechanism may comprise helical grooves engaging with caged ball bearings.

The helical grooves may be machined into the exhaust cam shaft 4, and the ball bearings may be contained within the power-control-drive-gear 6.

The exhaust valve 16 may be biased toward the open position, so that the exhaust valve 16 remains open until forced toward a closed position.

The inlet valve 20 may be biased toward the open position, so that the inlet valve 20 remains open until forced toward a closed position.

The biasing means may comprise a valve spring 21.

The valve spring 21 may be located inside the valves 16, 20.

The valve spring 21 may be retained by a valve spring anchor 14.

The valve spring anchor 14 may be a Y shape, or wishbone shape, so that the anchoring of the valve spring 21 does not impede the cams 12, 13 24 and cam shafts 4, 5.

Referring to FIG. 1, there is shown a valve timing diagram depicting a conventional timing arrangement known in the art, where the open and close timings of the inlet valve and exhaust valve are shown with respect to each of the four strokes of the piston.

The inlet valve can be seen to open shortly before the piston reaches top dead centre ('TDC'), prior to commencing the intake stroke. The inlet valve is then shown to close shortly after the piston passes bottom dead centre ('BDC'), after completing the intake stroke and commencing the compression stroke.

Although the exhaust valve can be seen to be open at the beginning of the intake stroke, it closes shortly thereafter and remains closed for the duration of the intake and compression strokes, and for the majority of the combustion stroke, opening towards the end of the combustion stroke to begin to expel combusted gases.

The exhaust valve remains open through the entire exhaust stroke, closing shortly after the piston passes TDC, at the beginning of the subsequent intake stroke.

As can be noted from FIG. 1 and the description, there is some overlap between the closing of the inlet valve and the opening of the exhaust valve.

Conventional mechanisms for variable valve timing are designed to adjust the duration of the inlet/exhaust valve overlap, so that the piston may take in and expel more air, or breath better, at higher revolutions, due to the greater duration of valve overlap.

Figure 2:
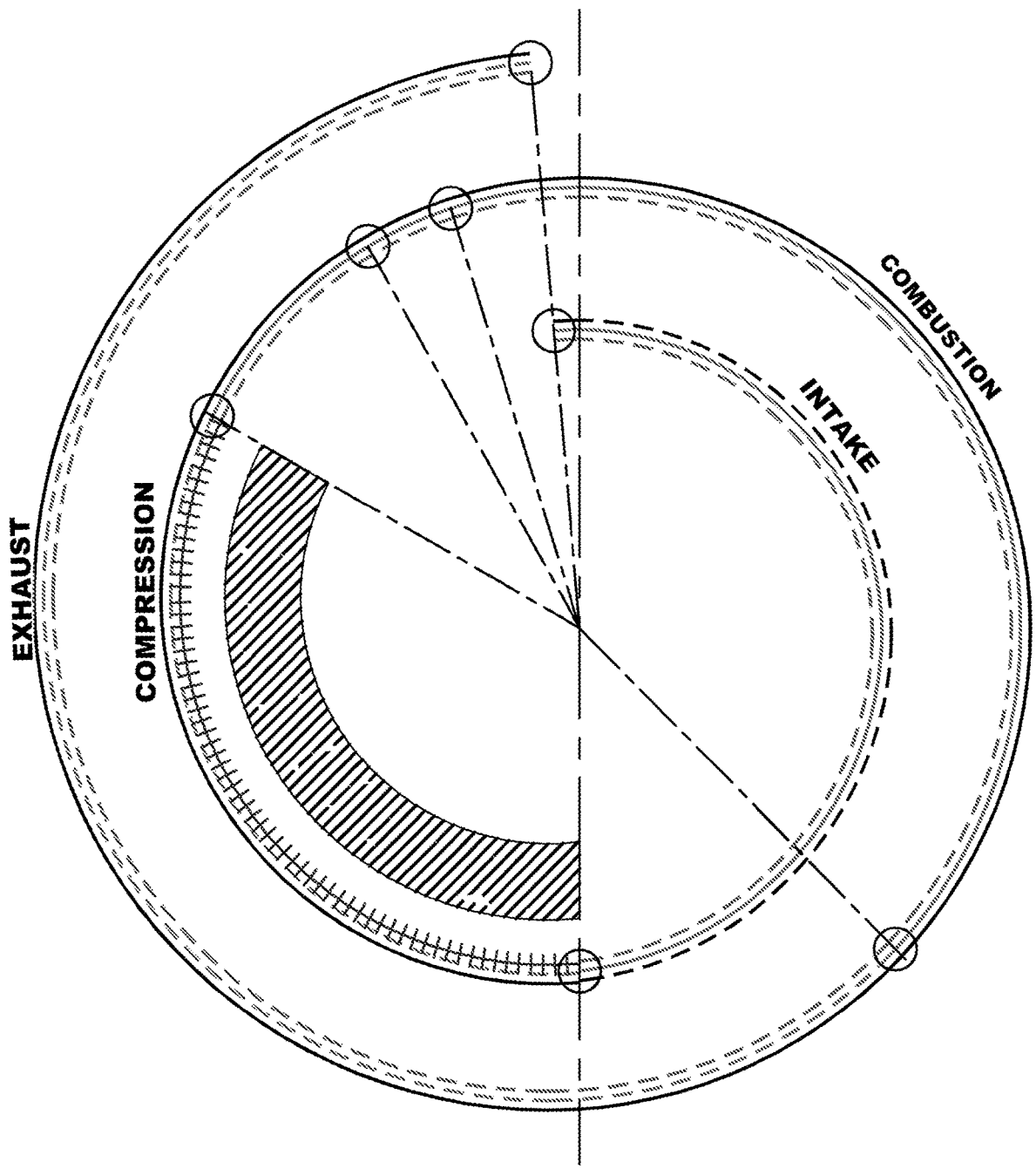
FIG. 2 is a valve timing diagram according to an embodiment of the present invention, where the approximate timing of the open and close events of the inlet valve and exhaust valve are shown with respect to each of the four strokes of the piston

Referring to FIG. 2, there is shown a valve timing diagram in accordance with an embodiment of the present invention, where the open and close times of the inlet valve 20 and exhaust valve 16 are shown with respect to each of the four strokes of the piston 29.

The diagram depicts the timing of the events controlled by the different cams represented by different tracks, with the inlet cam 24 being shown as the outer track, the No. 1 exhaust cam 13 as the middle track, and the No. 2 exhaust cam 12 as the inner track.

The legend identifies whether each valve is open, closed or be optionally opened/closed depending on the power requirement, at the various point during the four stroke cycle.

The events are identified by circles, with the various events throughout the four stroke cycle being described as follows.

As with the conventional arrangement, the inlet valve 20 can be seen to open shortly before the piston 29 reaches TDC, prior to commencing the intake stroke. The inlet valve 20 is then shown to close as the piston 29 passes BDC, as the intake stroke is completed and the compression stroke commences.

The exhaust valve 16 is depicted as closing as the intake stroke commences, as is the case with the conventional mechanism.

However, the exhaust valve 16 is then depicted optionally opening and then closing during the compression stroke, which is unconventional, as the exhaust valve 16 would conventionally remain closed during the entire compression stroke.

The exhaust valve 16 is then shown performing in the conventional manner, remaining closed through the majority of the combustion stroke, and opening toward the end of the combustion stroke, and remaining open through the entire exhaust stroke, and closing as the piston 29 reaches TDC, at the beginning of the subsequent intake stroke.

The different tracks for the different cams illustrate how the No. 1 exhaust cam 13, being the middle track, allows the exhaust valve 16 to open during the compression stroke, but the No. 2 exhaust cam 12, being the inner track, is configured to optionally keep the exhaust valve 16 closed, which is done under higher power requirements.

The cross-hatched arc identifies the region to which the embodiment of the present invention is directed, being the optional variable opening and closing of the exhaust valve 16 during the compression stroke.

Figure 3:
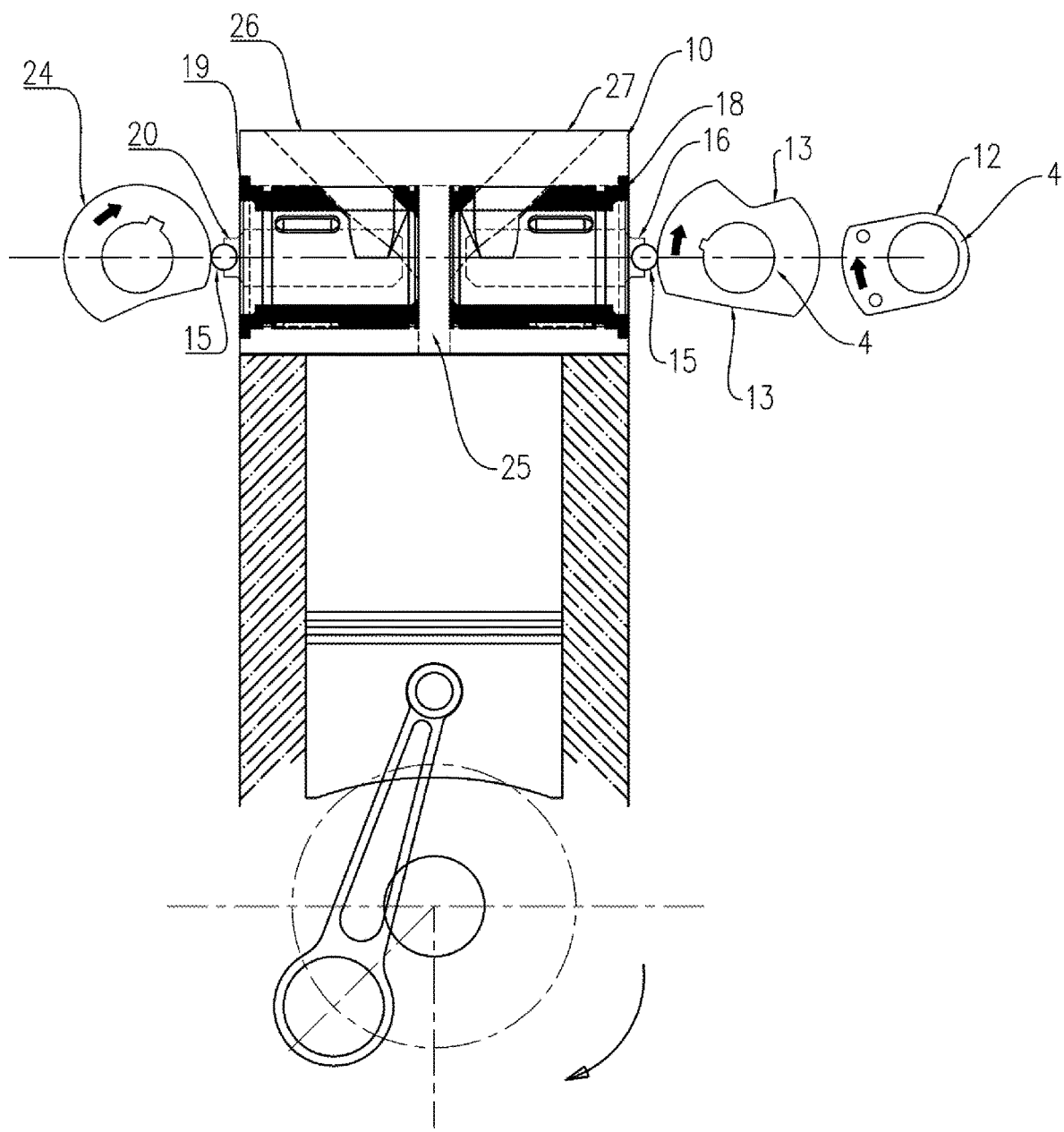
FIG. 3 is a cross sectional diagram according to an embodiment of the present invention, showing the cylinder block and piston arrangement, with the head comprising an inlet valve in the closed configuration and an exhaust valve in the closed configuration. No 1 Exhaust Cam and No 2 Exhaust cam are shown side by side for clarity, although in actual fact they will be superimposed along a common centreline.

Referring to FIG. 3, there is shown a cylinder block 32 of an internal combustion engine 1 according to an embodiment of the present invention.

The cylinder block 32 houses a piston 29, moveable between a first position and a second position and configured to drive a connecting rod 30 connected to a crank pin 31, causing rotational movement of a crankshaft (not numbered) and delivering power to the engine 1.

Shown above the piston 29 is the cylinder head 10, housing the inlet valve 20 located within the inlet valve sleeve 19, and the exhaust valve 16 located within the exhaust valve sleeve 18.

An inlet port 26 defines a channel from the exterior of the cylinder head 10 to the combustion chamber 25, via an aperture in the inlet valve sleeve 19.

An exhaust port 27 defines a channel from the exterior of the cylinder head 10 to the combustion chamber 25, via an aperture in the exhaust valve sleeve 18.

For the sake of clarity, the No. 1 Exhaust Cam 13 and No. 2 Exhaust Cam 12 are shown adjacent each other, and their respective subfigures; however, both cams 12, 13 are actually superimposed along the depicted centrelines (which are to be considered concentric).

Figure 4:
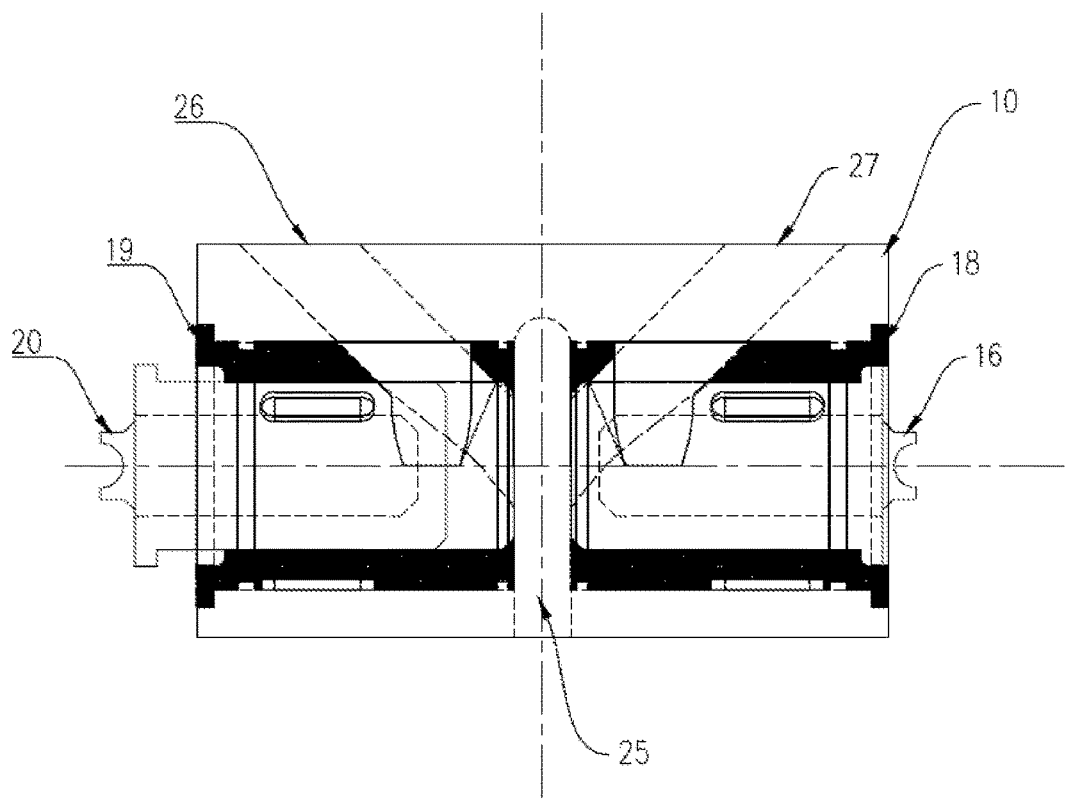
FIG. 4 is a cross section of the cylinder head, showing the inlet valve in the open position, and the exhaust valve in the close position.

Referring to FIG. 4, the exhaust valve 16 is moveable between an open configuration and a closed configuration, the exhaust valve 16 is shown in the closed configuration, in which the aperture in the exhaust valve sleeve 18 is covered, thus preventing airflow through the exhaust port 27 from the combustion chamber 25.

Figure 5:
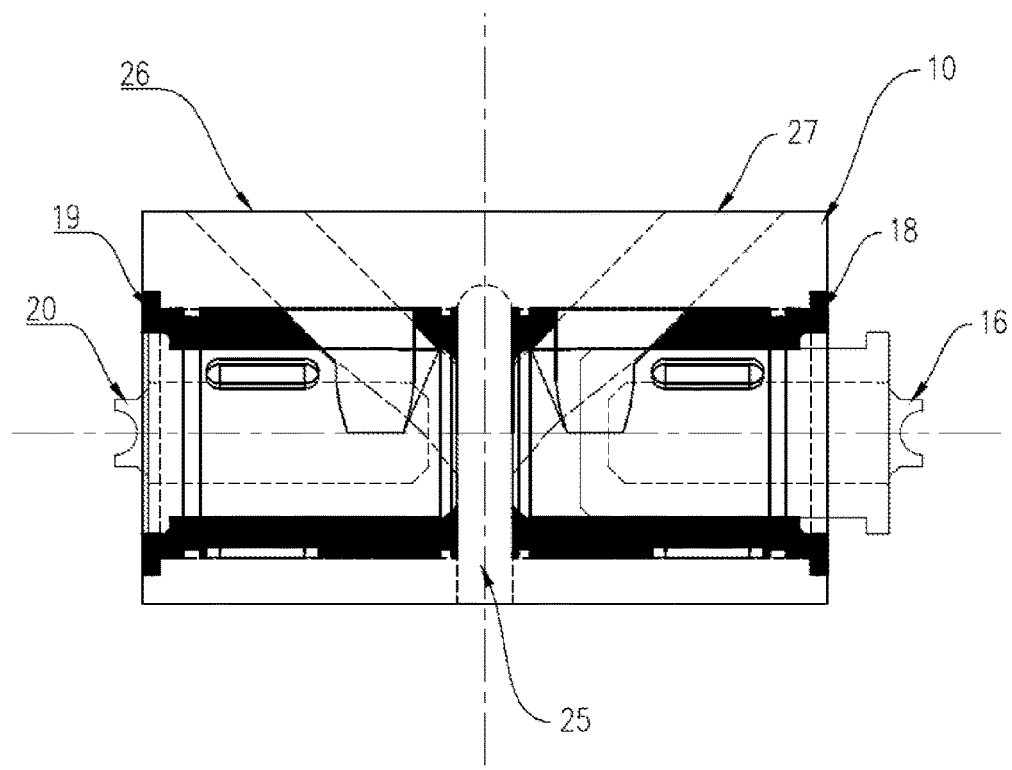
FIG. 5 is a cross section of the cylinder head, showing the inlet valve in the closed position, and the exhaust valve in the open position.

Referring to FIG. 5, the inlet valve 20 is moveable between an open configuration and a closed configuration, the inlet valve 20 is shown in the closed configuration, in which the aperture in the inlet valve sleeve 19 is covered, thus preventing airflow through the inlet port 26 to the combustion chamber 25.

Figure 6:
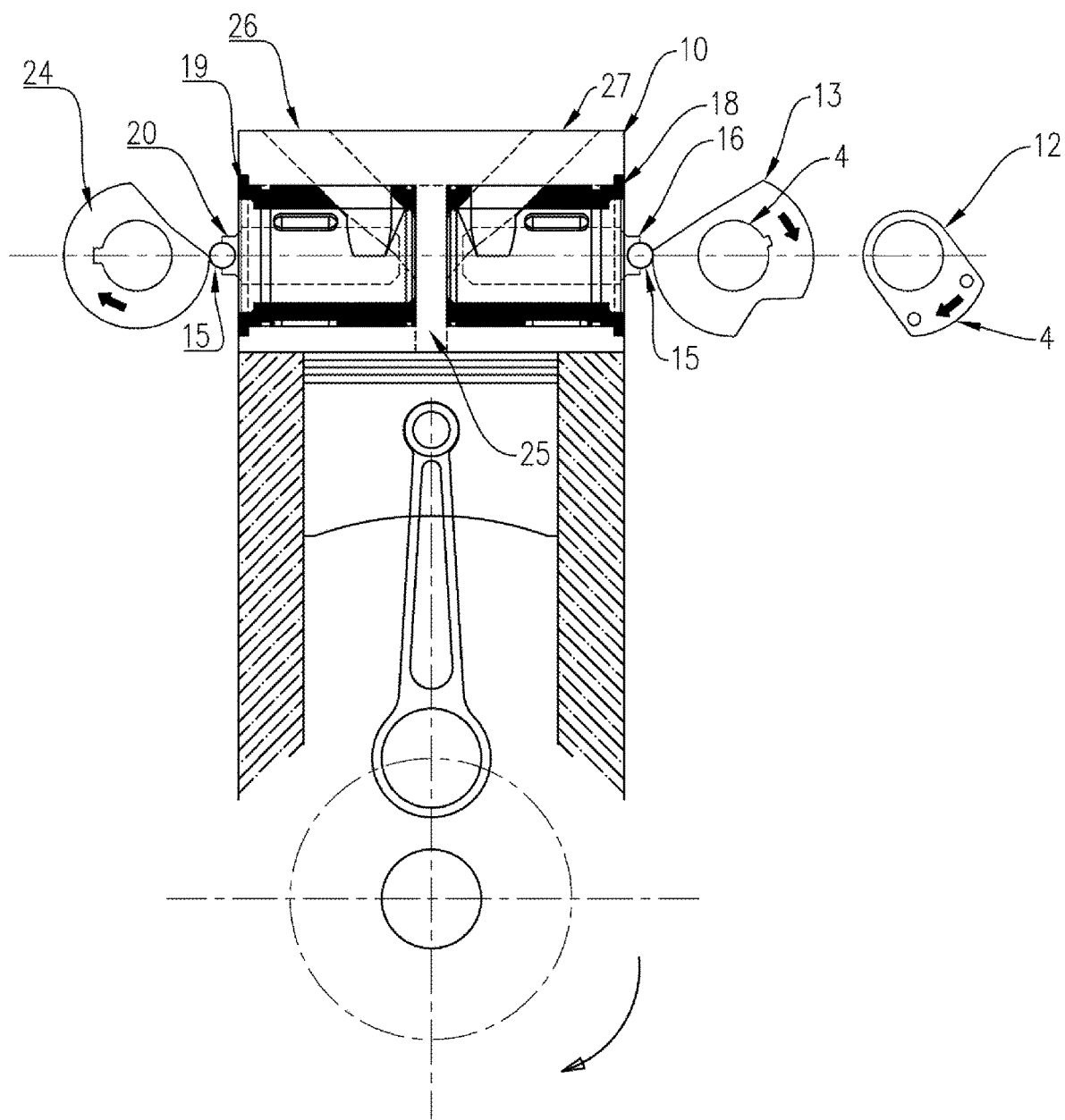
FIG. 6 is a sectional view of a cylinder block and cylinder head in accordance with an embodiment of the invention depicting the valve and cam arrangement at the start of intake stroke. No 1 Exhaust Cam and No 2 Exhaust cam are shown side by side for clarity, although in actual fact they will be superimposed along a common centreline.

Referring to FIG. 6 depicting the arrangement at the start of intake stroke, this shows the inlet valve 20 beginning to open, and the exhaust valve 16 having just closed.

Figure 7A:
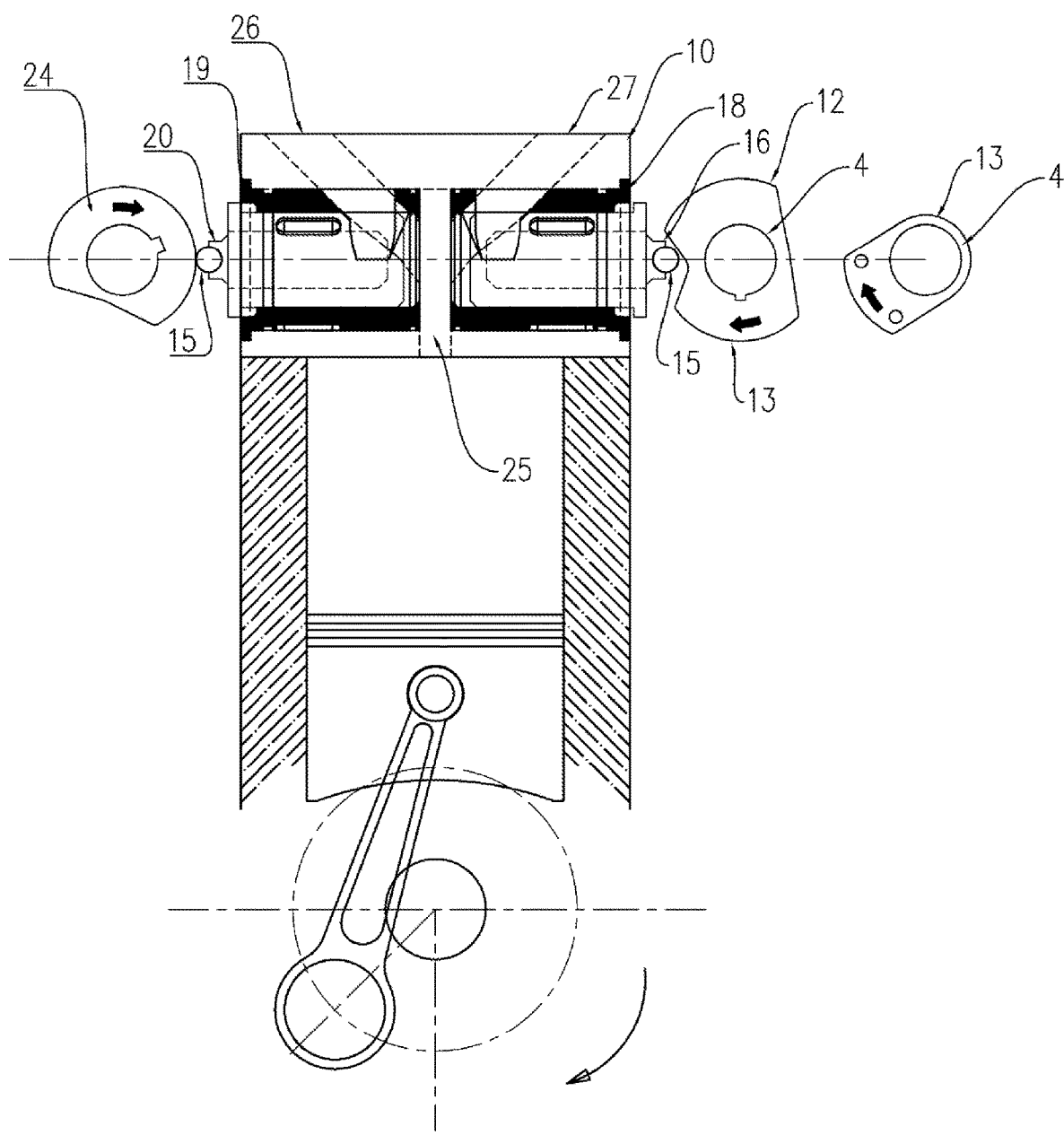
FIG. 7a is a sectional view of a cylinder block and cylinder head in accordance with an embodiment of the invention depicting the valve and cam arrangement early in the compression stroke, with the crank shaft shown approximately 45 degrees after bottom dead centre. In this view the No. 2 exhaust cam being partially engaged, at medium power condition, so that the exhaust valve will be kept closed for the majority of the compression stroke, but is opened briefly. No 1 Exhaust Cam and No 2 Exhaust cam are shown side by side for clarity, although in actual fact they will be superimposed along a common centreline.

Referring to FIG. 7a depicting the arrangement toward the beginning of the compression stroke when the No. 2 exhaust cam 12 is partially engaged, at medium power condition. This shows the inlet valve 20 closing, after having been opened for a substantial portion of the intake stroke. The exhaust valve 16 has been closed for the intake stroke and remains closed for the majority of the subsequent compression stroke, but is opened briefly.

Figure 7B:
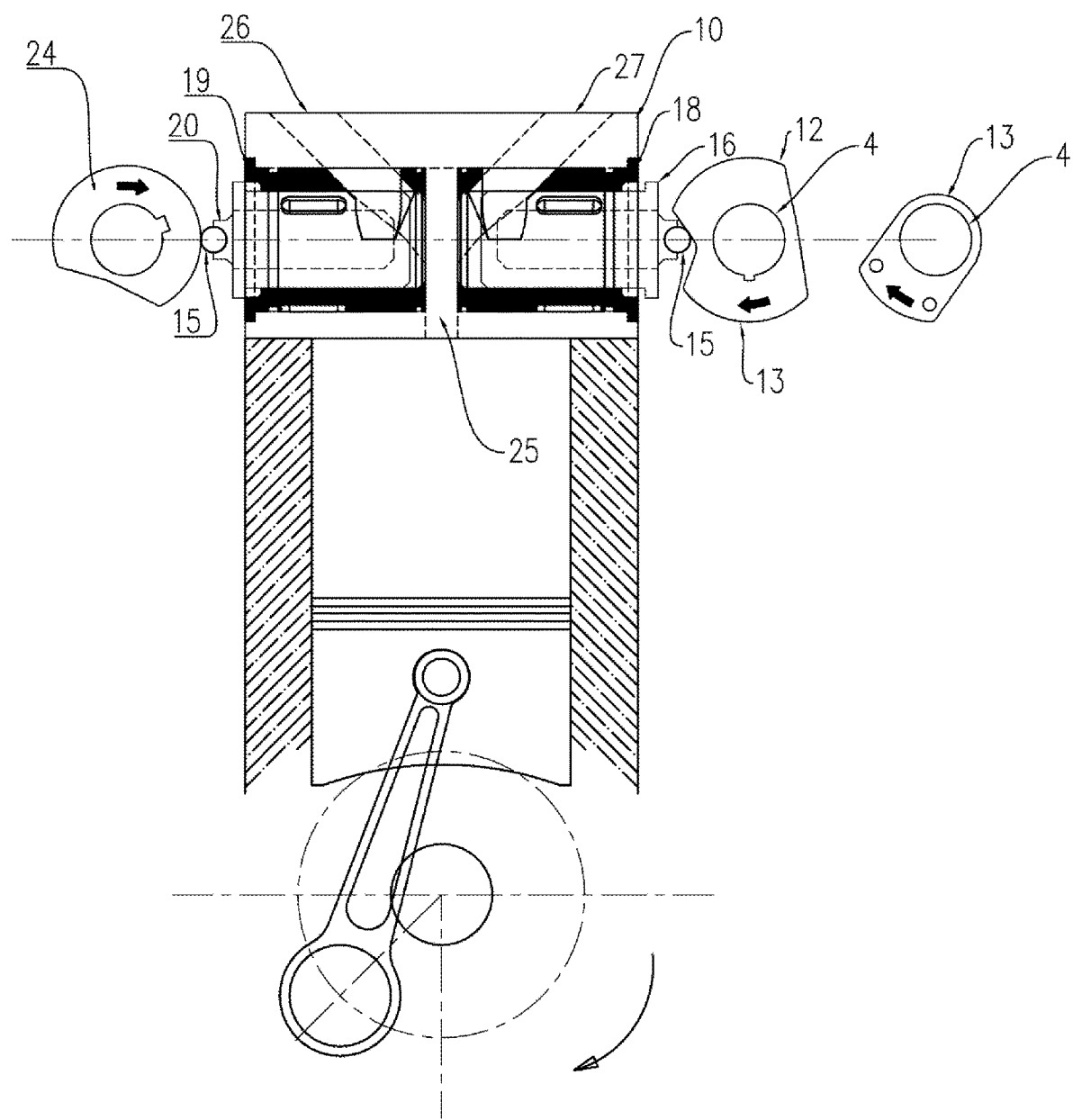
FIG. 7b is a sectional view of a cylinder block and cylinder head in accordance with an embodiment of the invention depicting the valve and cam arrangement early in the compression stroke, with the crank shaft shown approximately 45 degrees after bottom dead centre. In this view the No. 2 exhaust cam is not engaged, at low power condition, so that the exhaust valve will be allowed to open for a significant portion of the compression stroke. No 1 Exhaust Cam and No 2 Exhaust cam are shown side by side for clarity, although in actual fact they will be superimposed along a common centreline.

Referring to FIG. 7b depicting the arrangement toward the beginning of the compression stroke when the No. 2 exhaust cam 12 is not engaged, and the exhaust valve 16 is acted upon only by the No. 1 exhaust cam 13. This shows the inlet valve 20 closed, after having been opened for a substantial portion of the intake stroke. The exhaust valve 16 has been closed for the intake stroke and opens during the subsequent compression stroke when allowed to open by the No. 1 exhaust cam, as depicted here.

Figure 7C:
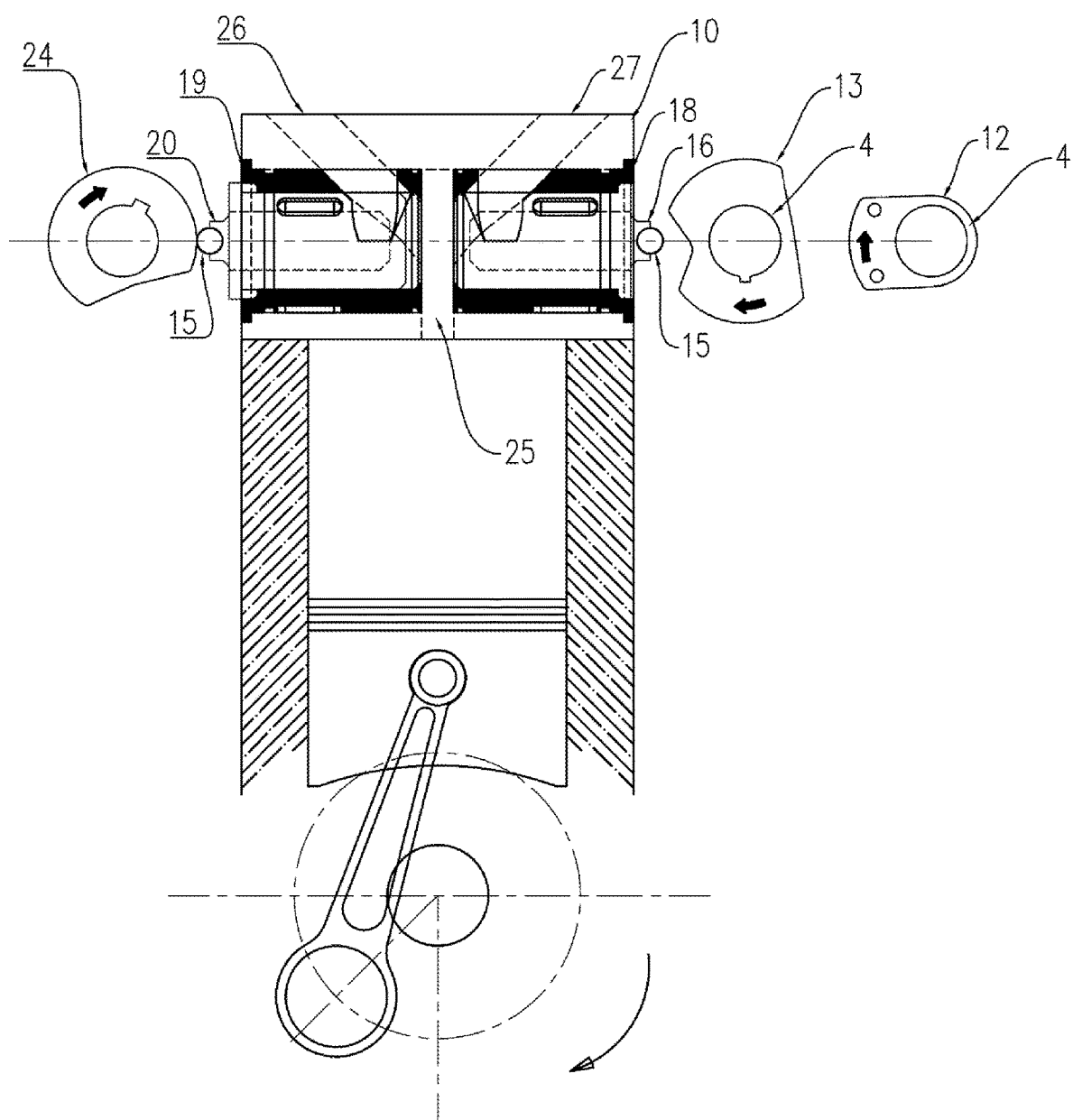
FIG. 7c is a sectional view of a cylinder block and cylinder head in accordance with an embodiment of the invention depicting the valve and cam arrangement early in the compression stroke, with the crank shaft shown approximately 45 degrees after bottom dead centre. In this view the No. 2 exhaust cam is fully engaged, at high power condition, so that the exhaust valve is kept closed for the entire compression stroke. No 1 Exhaust Cam and No 2 Exhaust cam are shown side by side for clarity, although in actual fact they will be superimposed along a common centreline.

Referring to FIG. 7c depicting the arrangement toward the beginning of the compression stroke when both the No. 1 exhaust cam 13 and No. 2 exhaust cam 12 are engaged, at maximum powder condition. Both the inlet valve 20 and the exhaust valve 16 remain closed for the compression stroke.

Figure 7D:
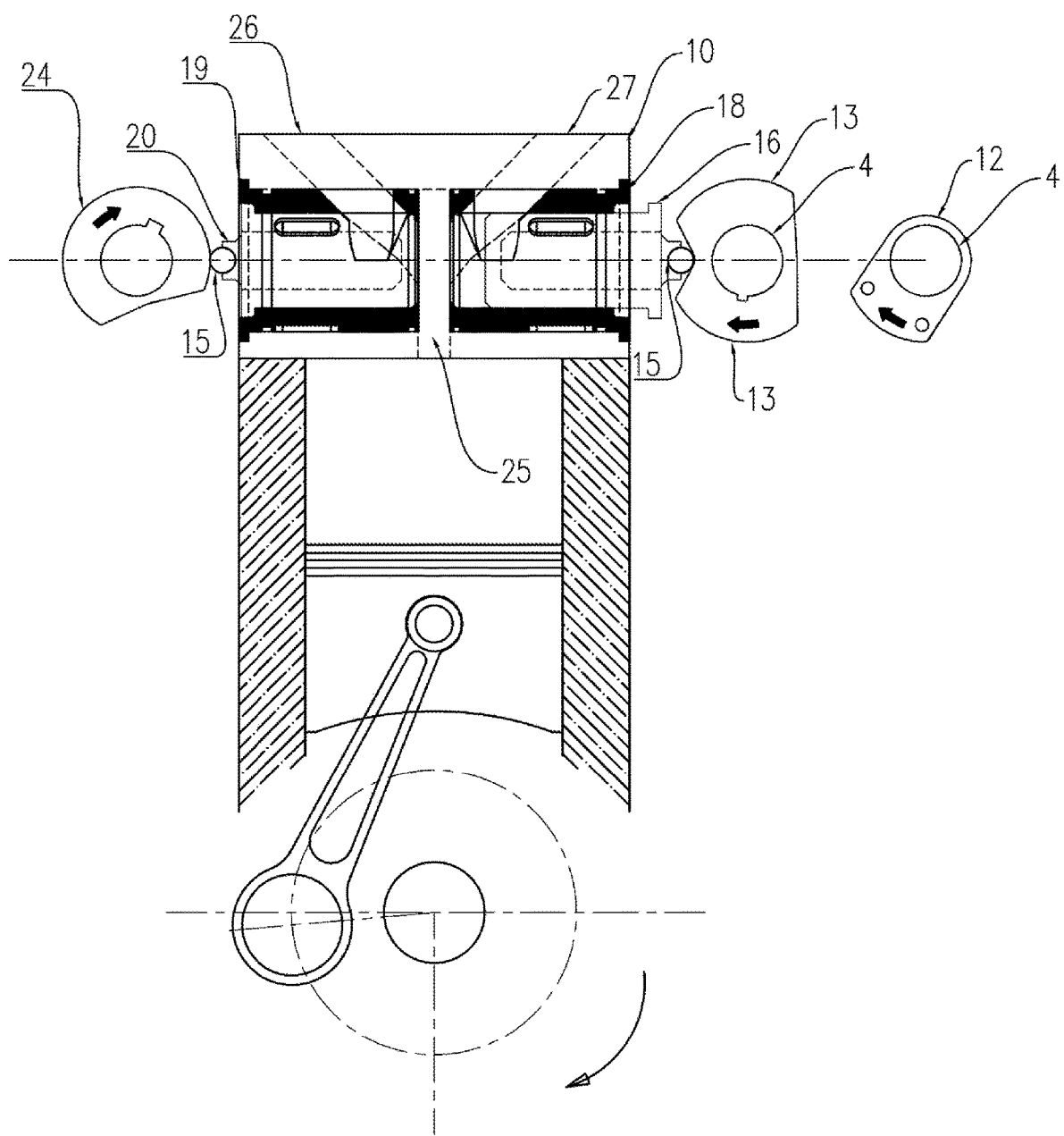
FIG. 7d is a sectional view of a cylinder block and cylinder head in accordance with an embodiment of the invention depicting the valve and cam arrangement approximately half way through the compression stroke, with the crank shaft shown almost 90 degrees after bottom dead centre. In this view the No. 2 exhaust cam is not engaged, at low power condition, so that the exhaust valve is allowed to open for a significant portion of the compression stroke. No 1 Exhaust Cam and No 2 Exhaust cam are shown side by side for clarity, although in actual fact they will be superimposed along a common centreline.
Figure 8A:
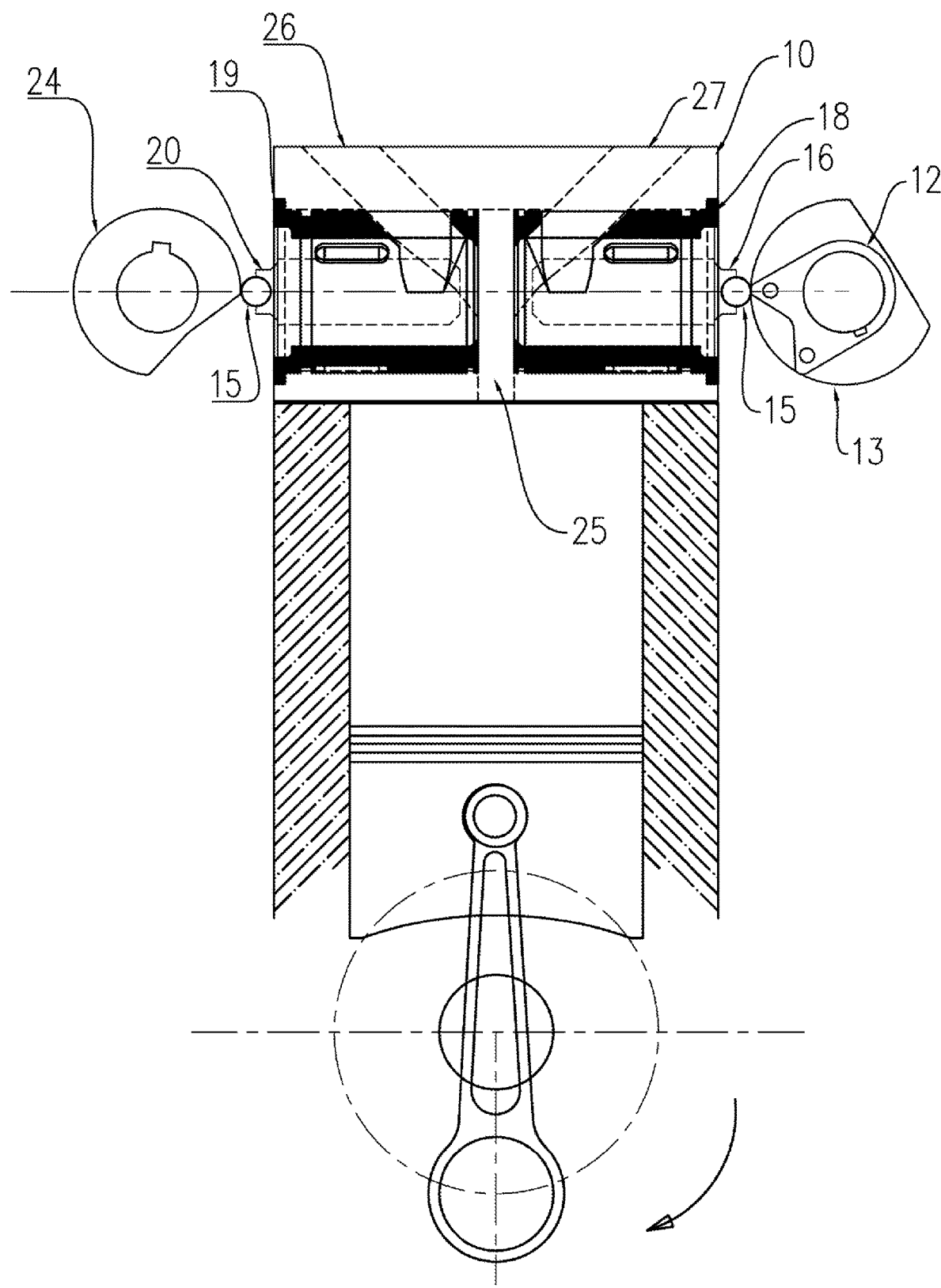
FIG. 8a is a sectional view of a cylinder block and cylinder head in accordance with an embodiment of the invention depicting the valve and cam arrangement at the beginning of the compression stroke. In this view the No. 2 exhaust cam is fully engaged, at high power condition, so that the exhaust valve is kept closed for the entire compression stroke. No 1 Exhaust Cam and No 2 Exhaust cam are shown superimposed along a common centreline to illustrate how this is achieved.
Figure 8B:
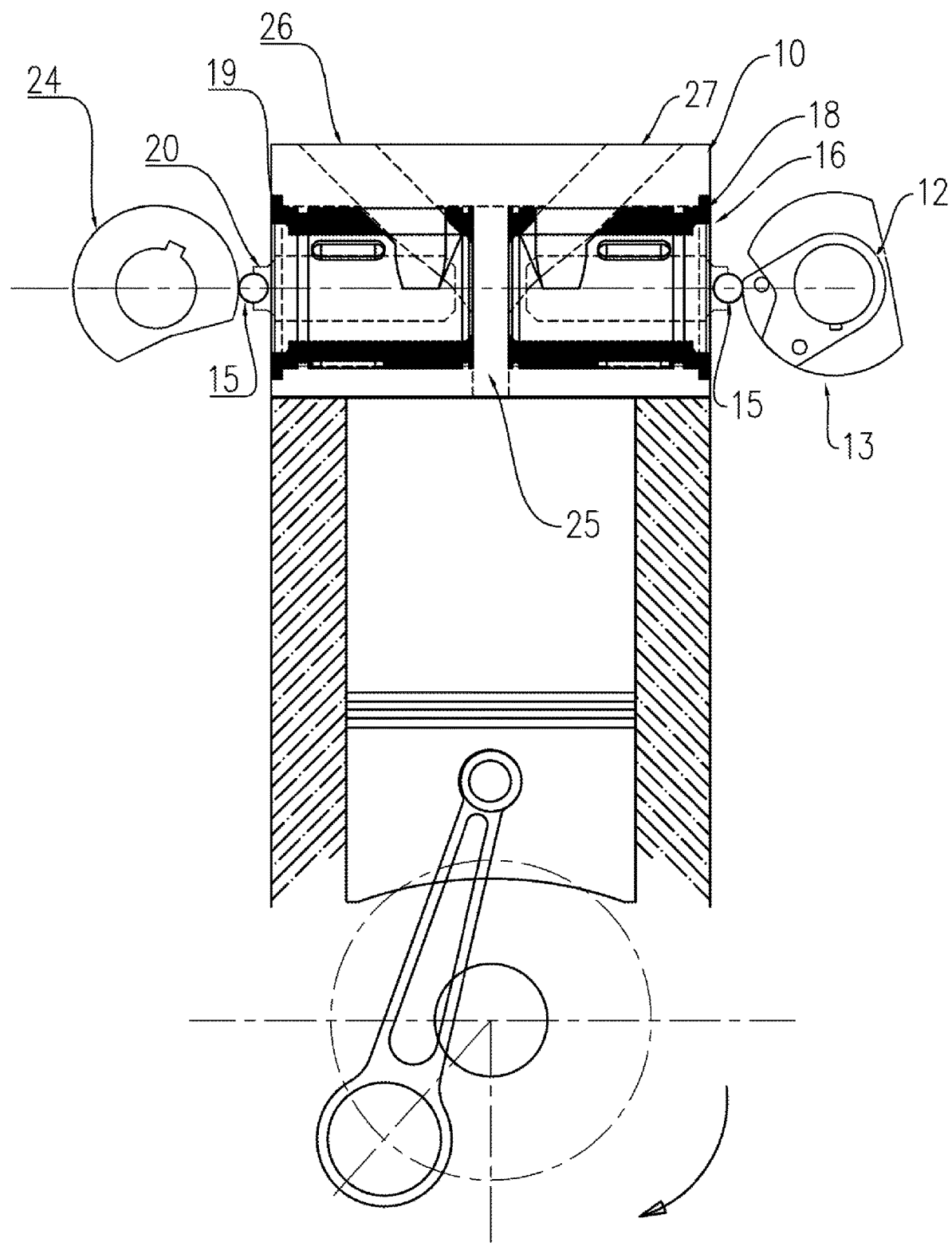
FIG. 8b is a sectional view of a cylinder block and cylinder head in accordance with an embodiment of the invention depicting the valve and cam arrangement early in the compression stroke, with the crank shaft shown approximately 45 degrees after bottom dead centre. In this view the No. 2 exhaust cam is partly engaged, at approximately 75% of power condition, so that the exhaust valve is opened briefly during the compression stroke. No 1 Exhaust Cam and No 2 Exhaust cam are shown superimposed along a common centreline to illustrate how this is achieved.
Figure 8C:
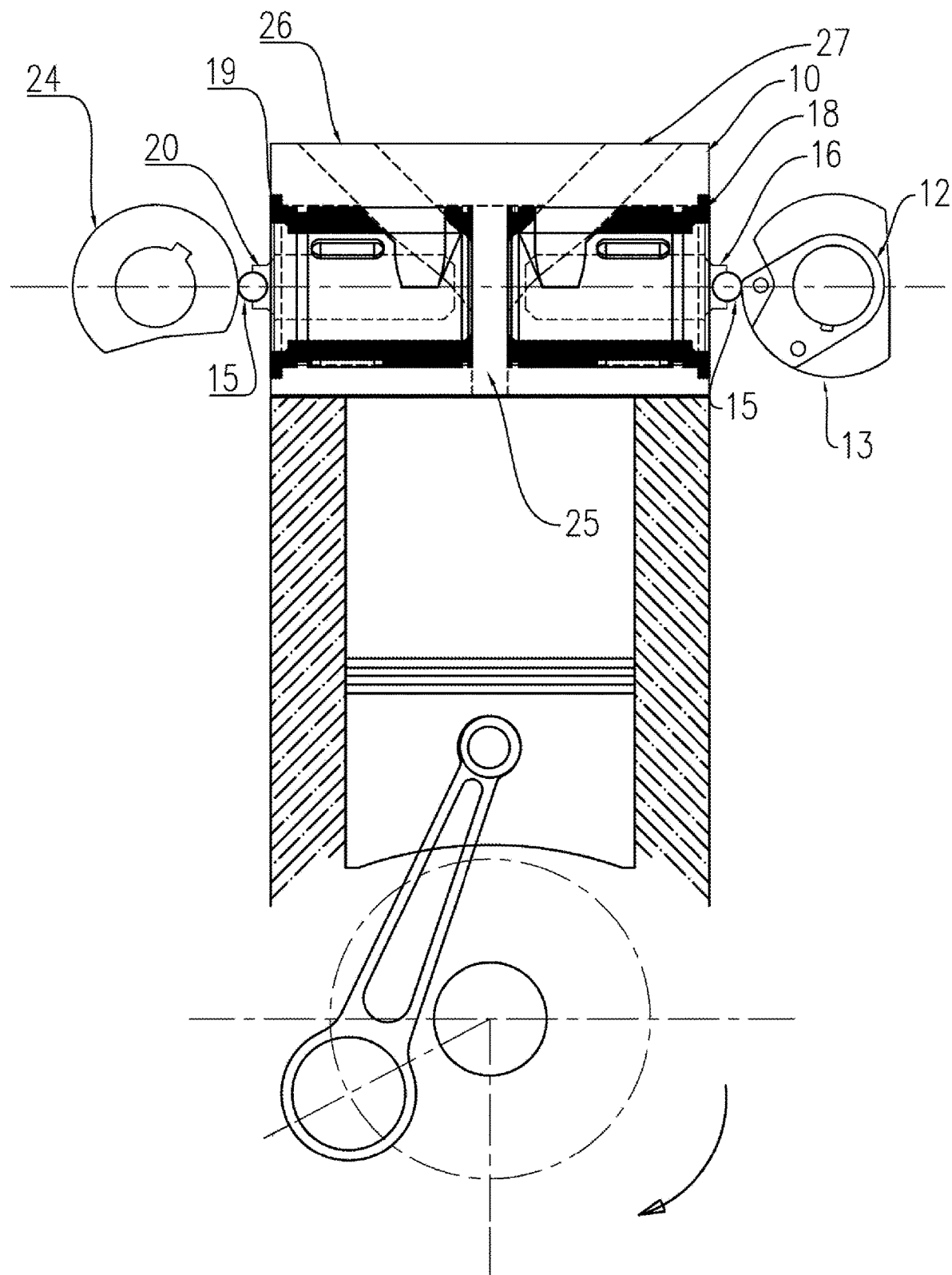
FIG. 8c is a sectional view of a cylinder block and cylinder head in accordance with an embodiment of the invention depicting the valve and cam arrangement early in the compression stroke, with the crank shaft shown approximately 62 degrees after bottom dead centre. In this view the No. 2 exhaust cam is partly engaged, at approximately 50% of power condition, so that the exhaust valve is opened for slightly longer during the compression stroke. No 1 Exhaust Cam and No 2 Exhaust cam are shown superimposed along a common centreline to illustrate how this is achieved.
Figure 8D:
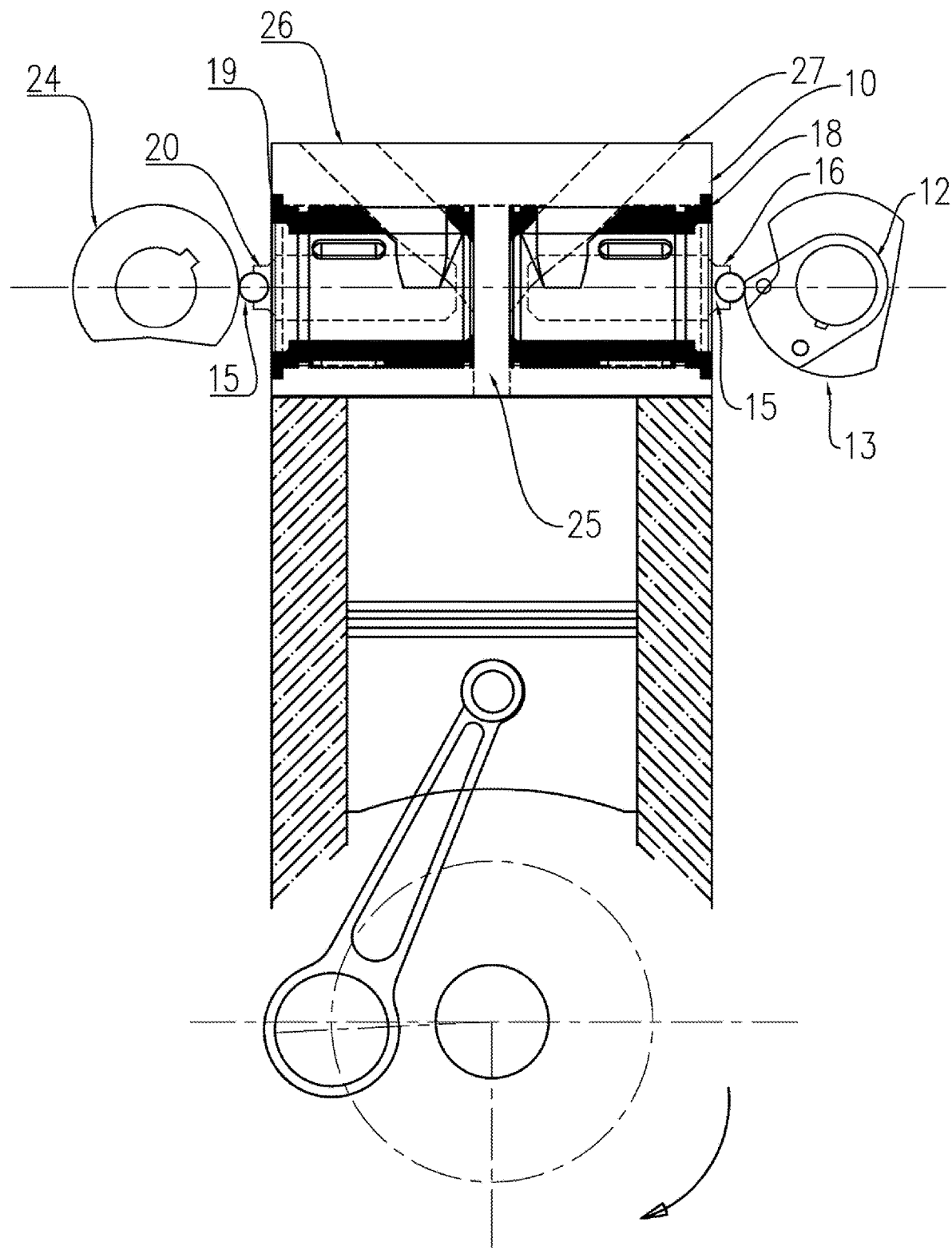
FIG. 8d is a sectional view of a cylinder block and cylinder head in accordance with an embodiment of the invention depicting the valve and cam arrangement early in the compression stroke, with the crank shaft shown approaching 90 degrees after bottom dead centre. In this view the No. 2 exhaust cam is only slightly engaged, at approximately 25% of power condition, so that the exhaust valve is opened for longer during the compression stroke. No 1 Exhaust Cam and No 2 Exhaust cam are shown superimposed along a common centreline to illustrate how this is achieved.
Figure 8E:
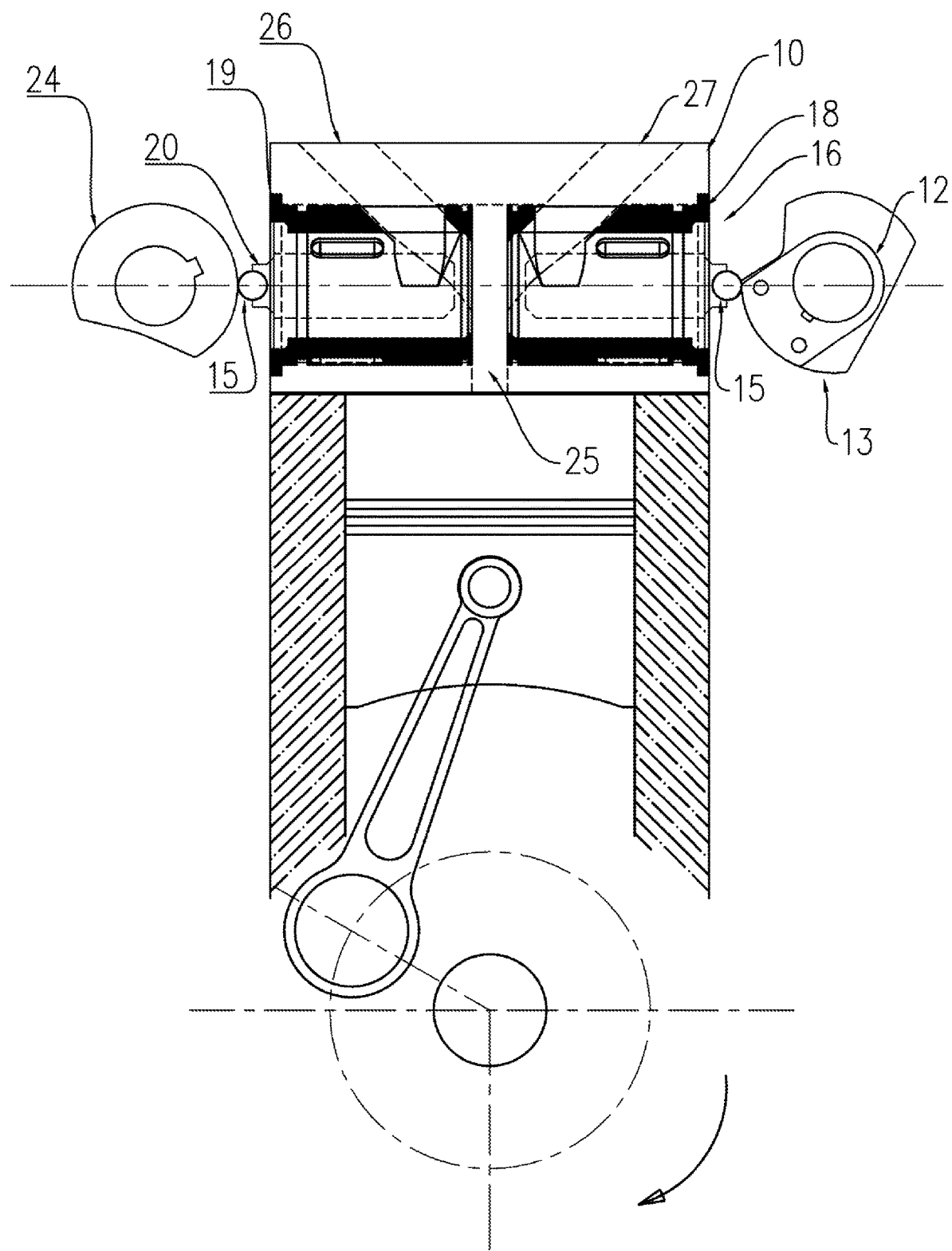
FIG. 8e is a sectional view of a cylinder block and cylinder head in accordance with an embodiment of the invention depicting the valve and cam arrangement later in the compression stroke, with the crank shaft shown approaching 120 degrees after bottom dead centre. In this view the No. 2 exhaust cam is not engaged, at low power condition (for example during engine idle), so that the exhaust valve is opened for the maximum duration of the compression stroke. No 1 Exhaust Cam and No 2 Exhaust cam are shown superimposed along a common centreline to illustrate how this is achieved.

Referring to FIG. 7d depicting the arrangement around the middle of the compression stroke when the No. 2 exhaust cam 12 is not engaged, and the exhaust valve 16 is acted upon only by the No. 1 exhaust cam 13, at minimum powder condition. This shows the inlet valve 20 being closed for the remainder of the compression stroke, and the exhaust valve 16 is allowed to open for a portion of the duration of the compression stroke, allowing a large quantity of air to be expelled.

Referring to FIG. 8a thru 8e, which show further depictions of the arrangement at varying positions during the compression stroke, and the No. 2 exhaust cam 12 in different configurations.

FIG. 8a thru 8e show the cams superimposed, arranged as they would be in use, to illustrate how the angular adjustment between the No. 1 exhaust cam 13 and the No. 2 exhaust cam 12 allows the exhaust valve to be optionally opened during the compression stroke.

Figure 9:
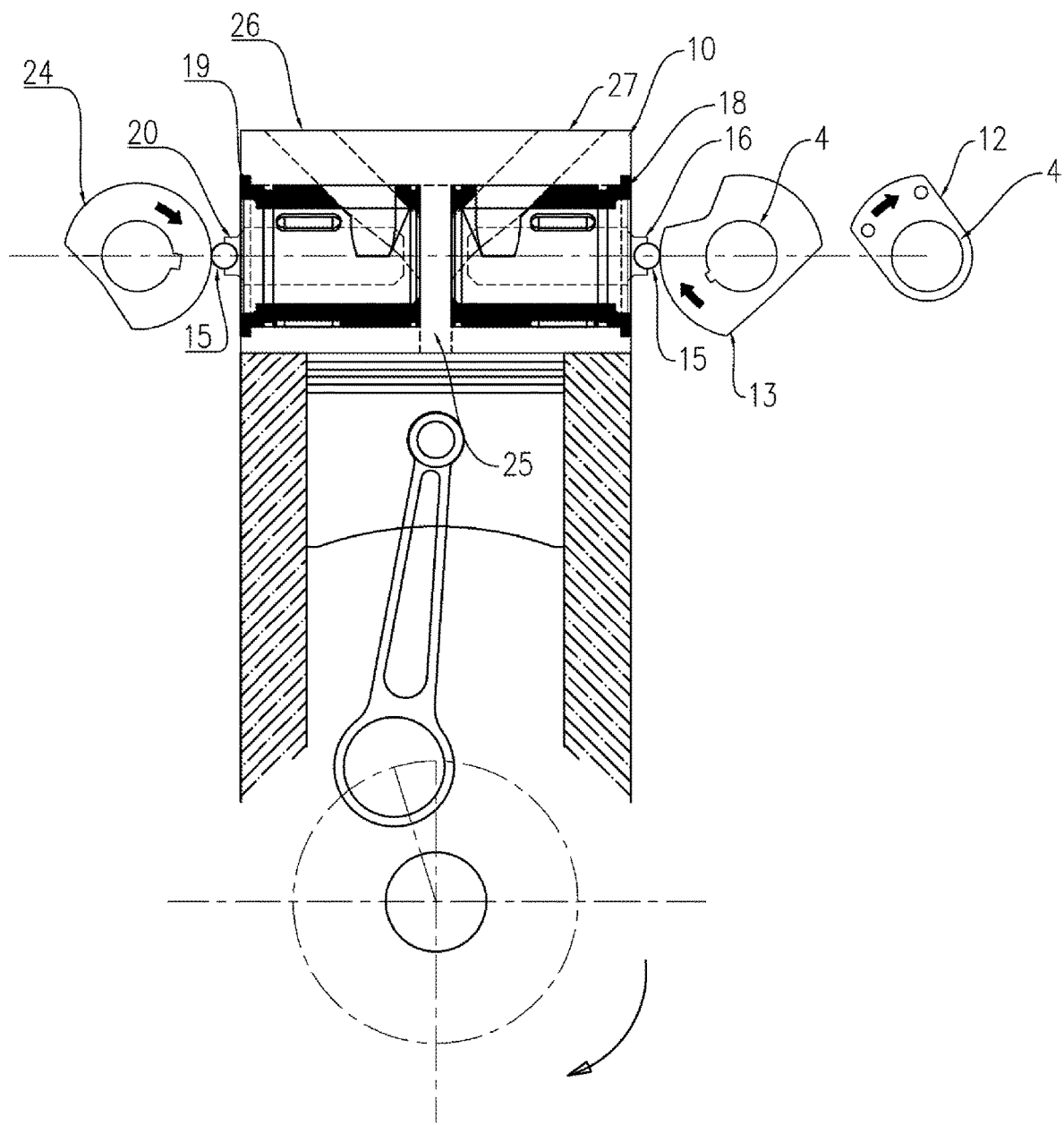
FIG. 9 is a sectional view of a cylinder block and cylinder head in accordance with an embodiment of the invention depicting the valve and cam arrangement at the end of the compression stroke and the start of the power stroke, with the cylinder approaching top dead centre. No 1 Exhaust Cam and No 2 Exhaust cam are shown side by side for clarity, although in actual fact they will be superimposed along a common centreline.

Referring to FIG. 9 depicting the arrangement at the point of fuel injection, with both the inlet valve 20 and exhaust valve 16 closed.

Figure 10:
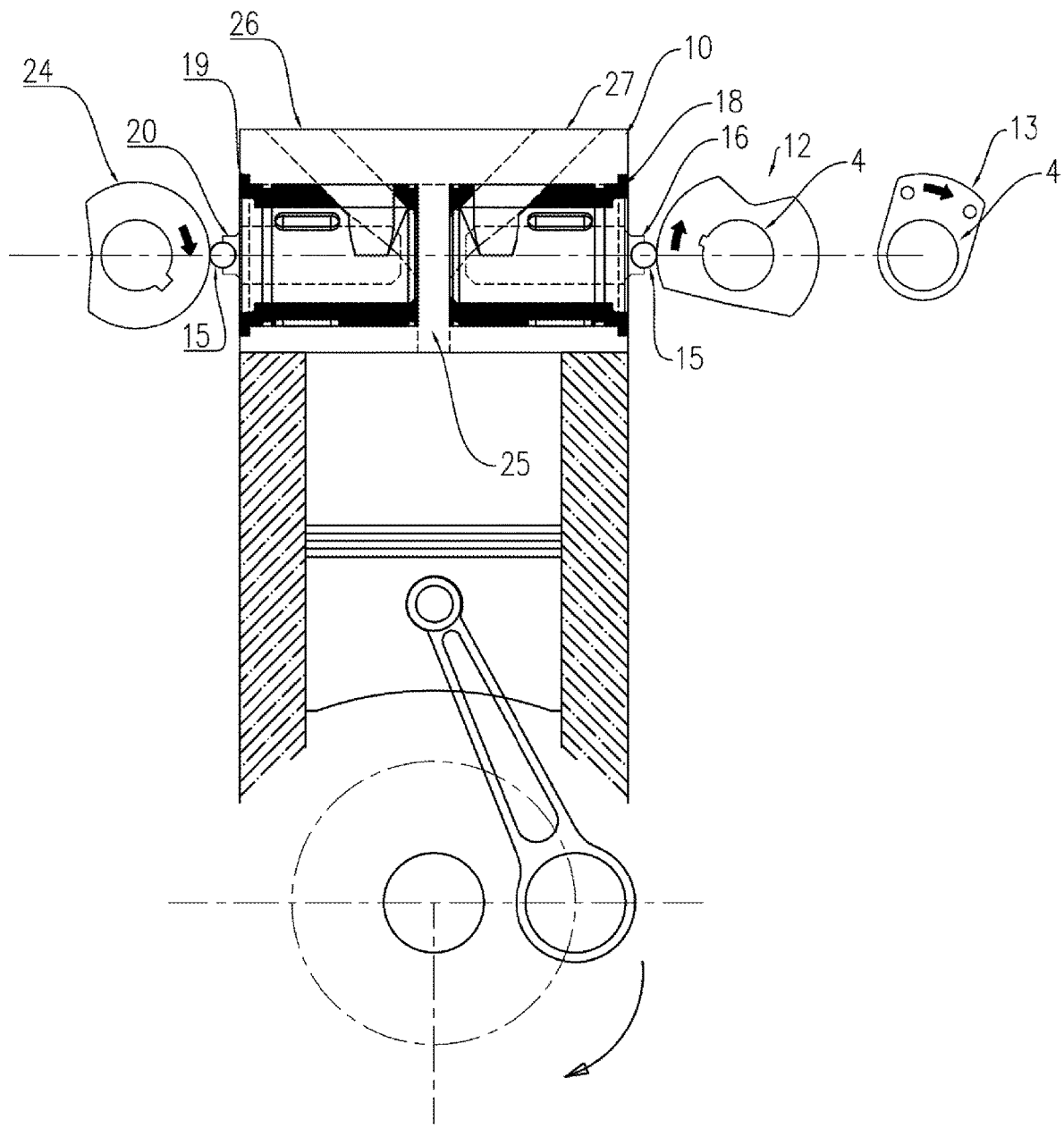
FIG. 10 is a sectional view of a cylinder block and cylinder head in accordance with an embodiment of the invention depicting the valve and cam arrangement at partway through the combustion stroke. No 1 Exhaust Cam and No 2 Exhaust cam are shown side by side for clarity, although in actual fact they will be superimposed along a common centreline.

Referring to FIG. 10 depicting the arrangement half way through to combustion stroke, with both the inlet valve 20 and exhaust valve 16 closed.

Figure 11:
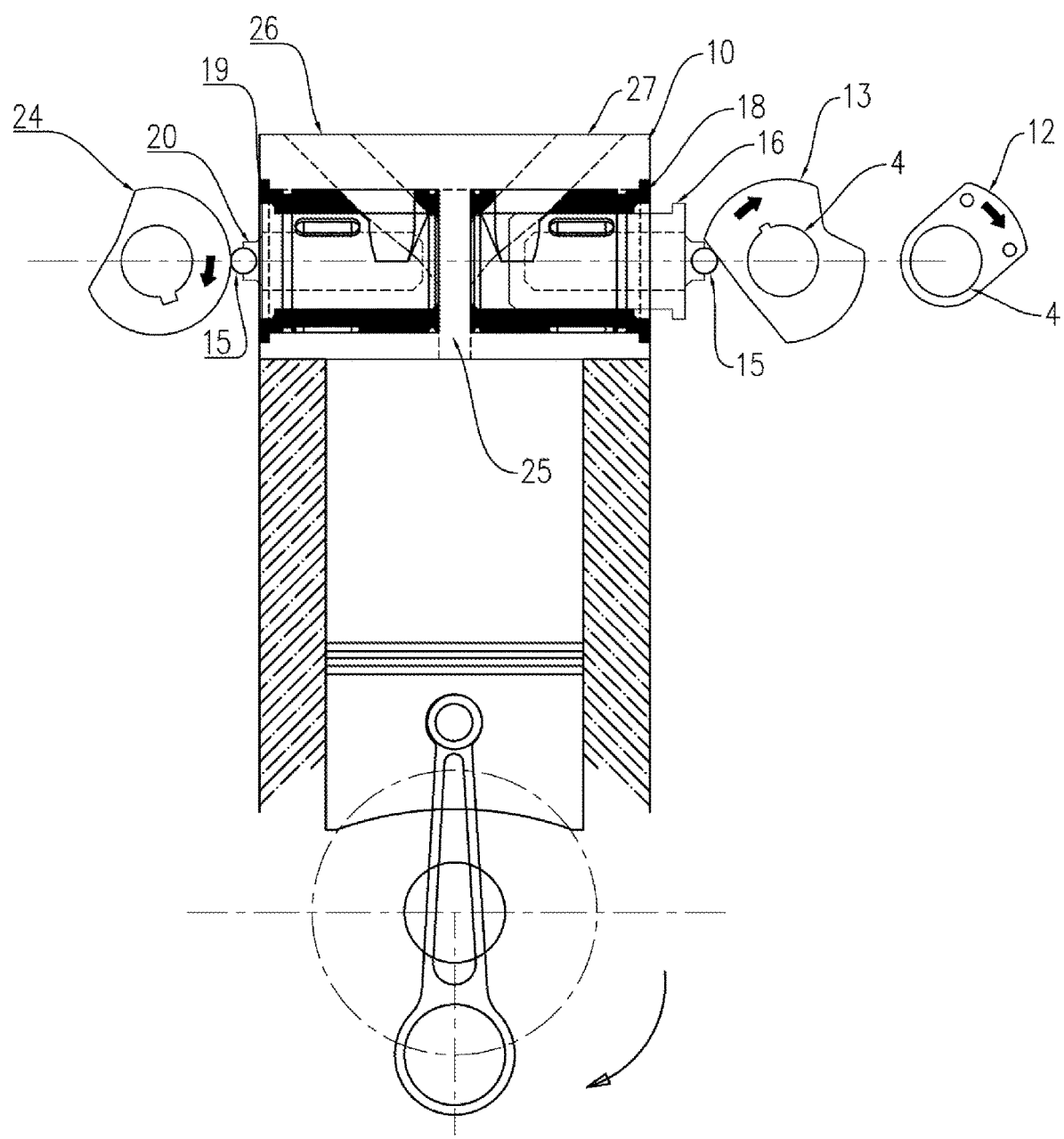
FIG. 11 is a sectional view of a cylinder block and cylinder head in accordance with an embodiment of the invention depicting the valve and cam arrangement at the end of combustion stroke. No 1 Exhaust Cam and No 2 Exhaust cam are shown side by side for clarity, although in actual fact they will be superimposed along a common centreline.

Referring to FIG. 11 depicting the arrangement at the end of the combustion stroke, with the inlet valve 20 closed and exhaust valve 16 opening.

Figure 12:
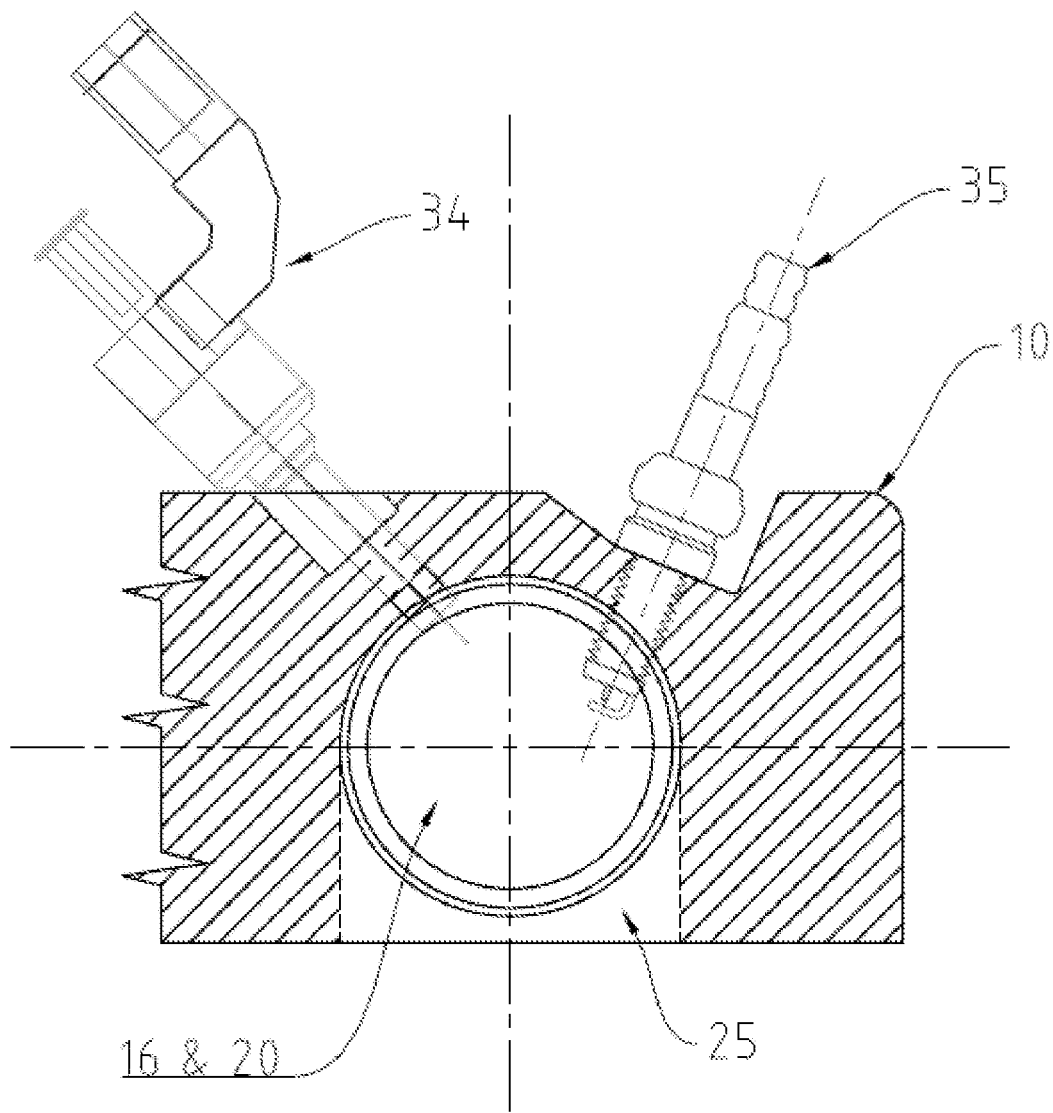
FIG. 12 shows a section view looking along the axis of the inlet valve and exhaust valve, showing the arrangement of the fuel injector and the ignition means in accordance with an embodiment of the present invention, as shown fuel may be directed toward the ignition point.

Referring to FIG. 12 showing the arrangement of the fuel injector and the ignition means in accordance with an embodiment of the present invention, as shown, fuel may be directed toward the ignition point of the ignition means 35.

Figure 13:
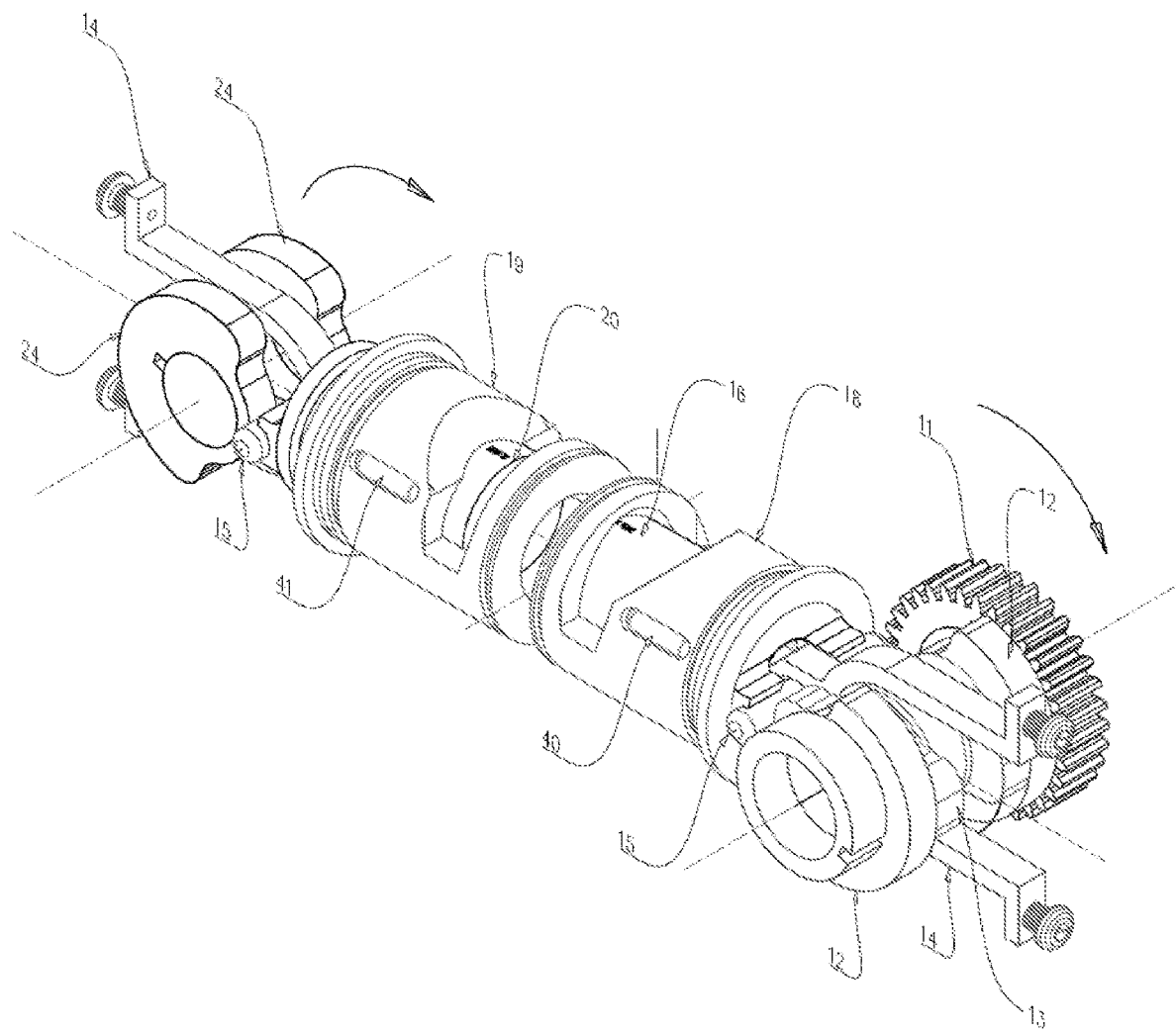
FIG. 13 is an isometric view showing and embodiment of the present invention, in which the inlet valve and exhaust valve are shown with their respective valve sleeves, cams and follower pins.

Referring to FIG. 13, which shows the inlet valve 20 and exhaust valve 16 are shown with their respective valve sleeves 19, 18, cams, 24, 12, 13 and follower pins 15.

Figure 14:
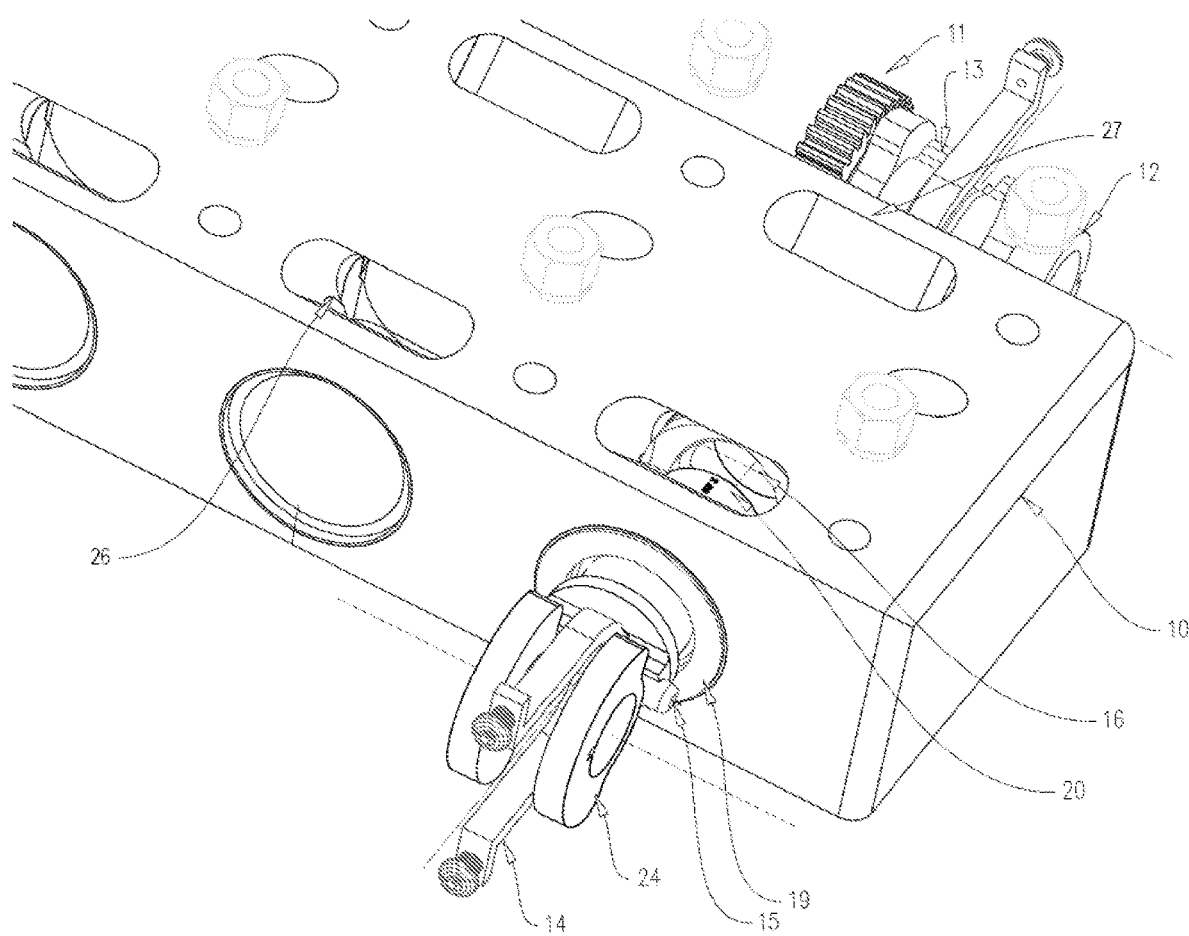
FIG. 14 is an isometric view showing the cylinder head, and further showing the fluid flow path of the inlet port, which is configured to direct airflow toward the end of the opposed exhaust valve.

Referring to FIG. 14, which shows an isometric view showing the cylinder head 10, and further showing the fluid flow path of the inlet port 26, which is configured to direct airflow toward the end of the opposed exhaust valve 16.

Figure 15:
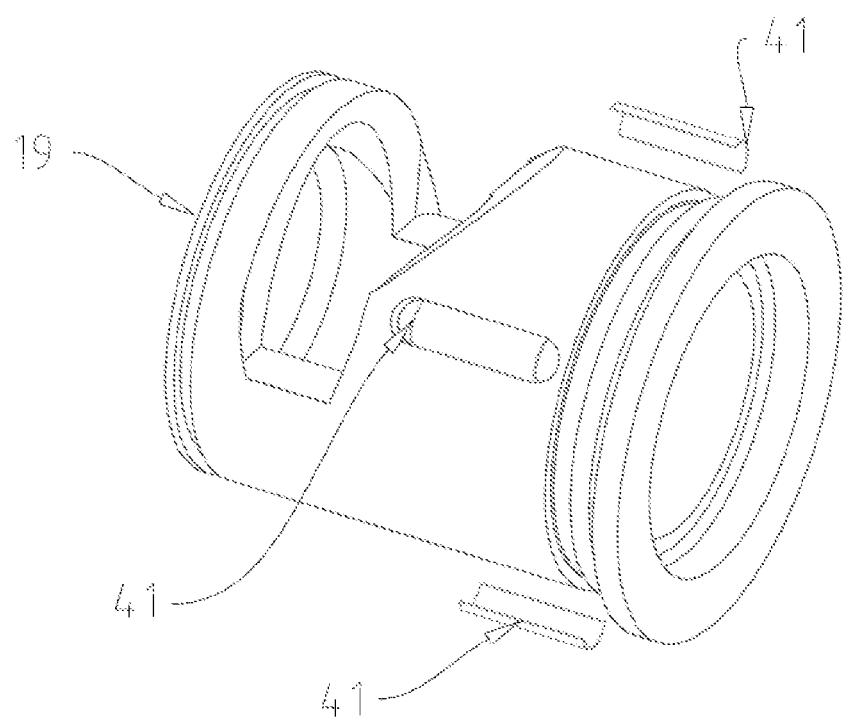
FIGS. 15 and 16 show the inlet valve sleeve and exhaust valve sleeve, including their respective dampers.
Figure 16:
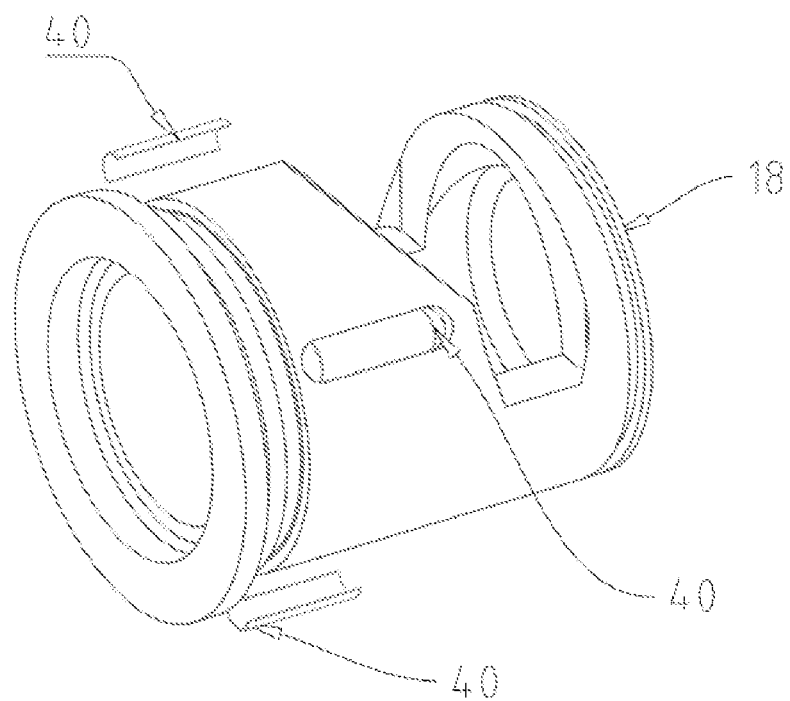

Referring to FIGS. 15 and 16, which show the inlet valve sleeve 19 and exhaust valve sleeve 18, including their respective dampers 41, 40.

Figure 17:
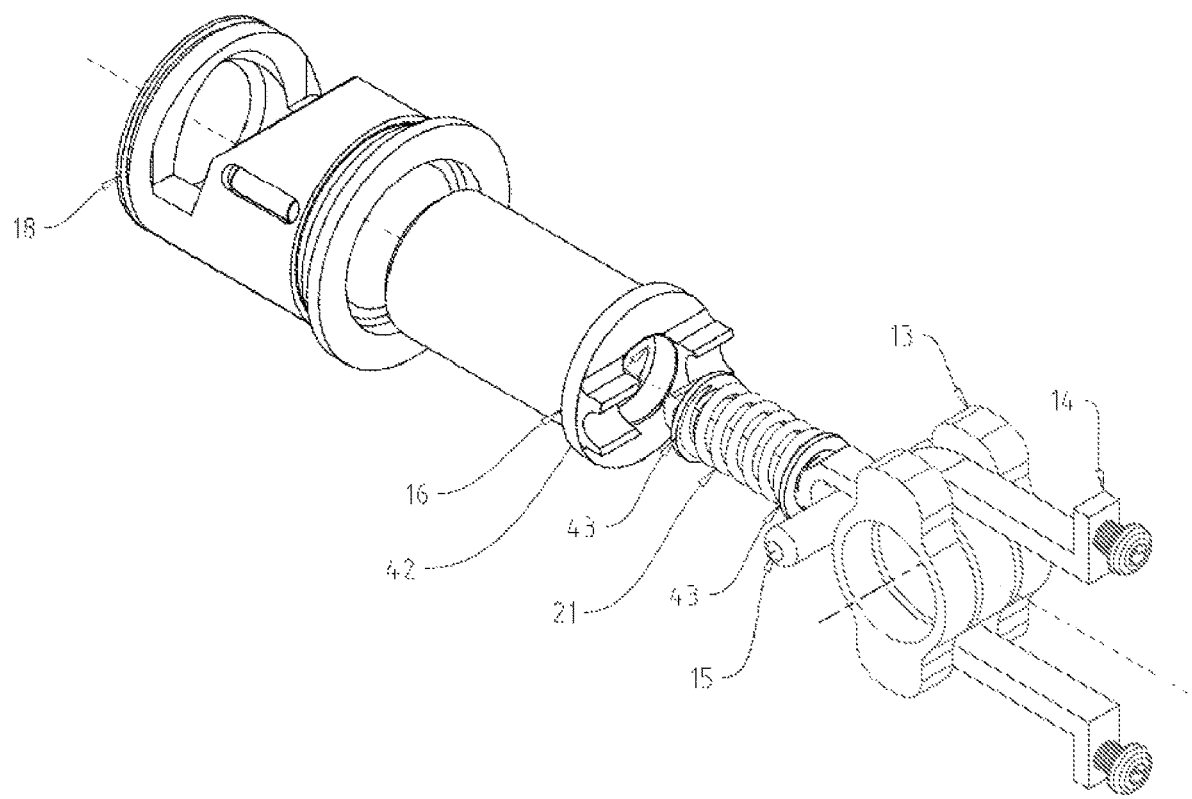
FIG. 17 shows the exhaust valve exploded arrangement according to an embodiment of the invention, showing an exhaust valve sleeve, exhaust valve, valve spring, follower pin, No. 1 exhaust cam and valve spring anchor.

Referring to FIG. 17, the view shows the exhaust valve arrangement according to one embodiment of the invention, showing an exhaust valve sleeve 18, exhaust valve 16, valve spring 21, follower pin 15, exhaust cam 13 and valve spring anchor 14.

The view further shows the valve spring 21 being restrained at the outer end within the exhaust valve 16 by a circlip 42, and at the other end by the valve spring anchor 14.

The valve spring 21 ends may also be restrained using collets 43.

Figure 18:
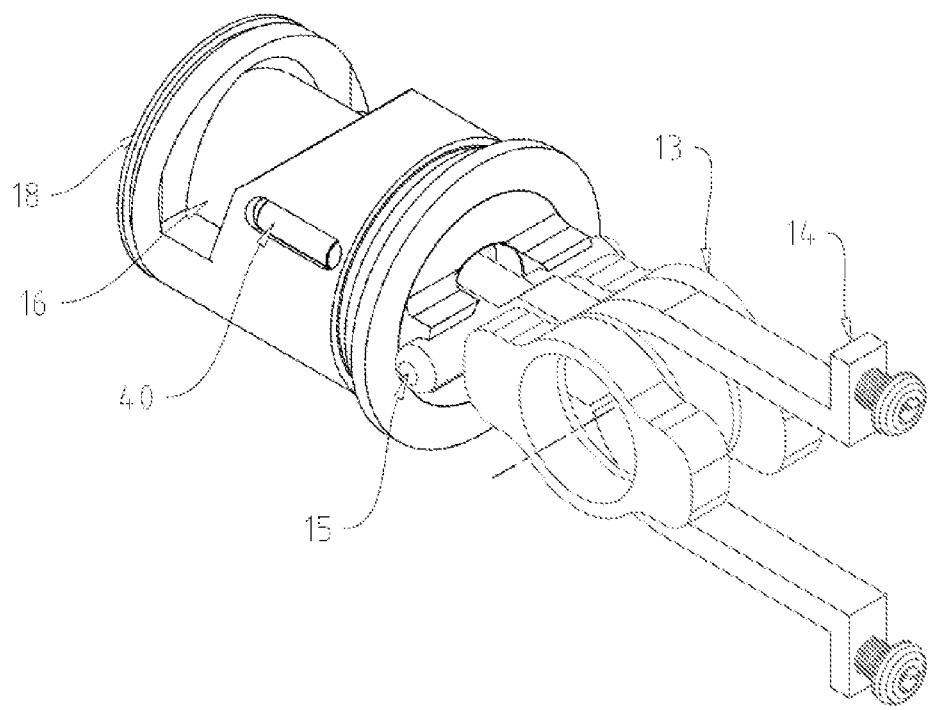
FIGS. 18 and 19 show the exhaust valve arrangement according to one embodiment of the invention, showing an exhaust valve sleeve, exhaust valve, valve spring, follower pin, No. 1 exhaust cam and valve spring anchor. The Figures show the exhaust valve in both the closed (FIG. 18) and open (FIG. 19) configurations.
Figure 19:
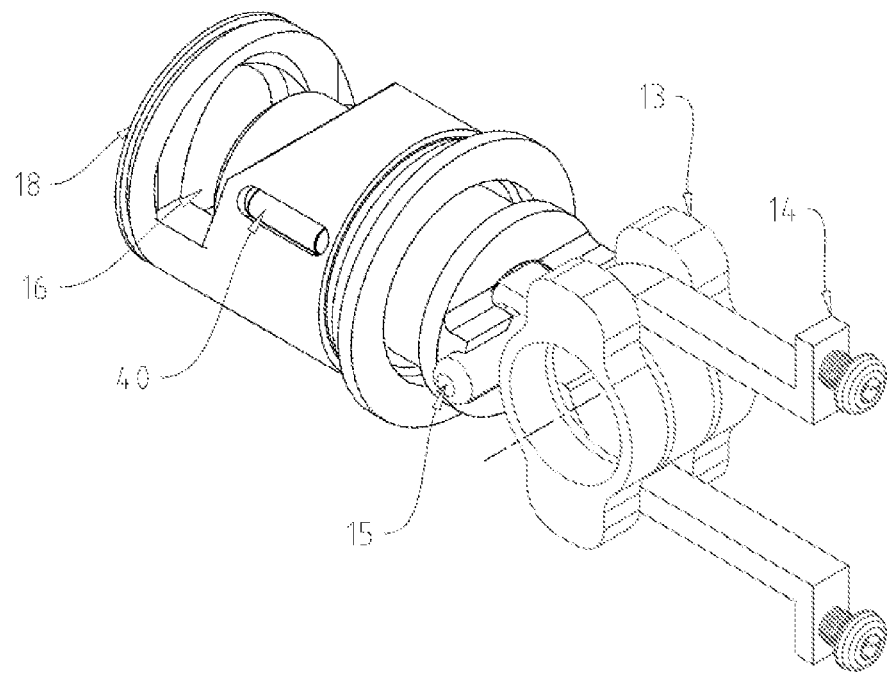

Referring to FIGS. 18 and 19 the views show the exhaust valve 16 arrangement according to one embodiment of the invention, showing an exhaust valve sleeve 18, exhaust valve 16, valve spring 21, follower pin 15, exhaust cam 13 and valve spring anchor 14. The Figures show the exhaust valve 16 in both the closed (FIG. 18) and open (FIG. 19) configurations.

In the embodiment shown in FIGS. 17, 18 and 19, the biasing means comprises the valve spring 21, which is retained at one end on the inner surface of the piston valve, and at the other end by the valve spring anchor 14. Only one exhaust cam 13 pair is shown in these Figures, the profile of which is illustrative to indicate the means by which the valve may be driven closed and opened, and is not necessarily representative of the profile of the cam 13 of the present invention.

The valve arrangement shown in FIGS. 17, 18 and 19, may also be applied to the inlet piston valve 20.

Throughout the Figures, the profiles of the cams 12, 13 and 24, are shown in an indicative manner, to illustrate the means by which the valves 16, 20 can be opened and closed. The profile of the cams 12, 13, 24 should not be considered as a definitive depiction of the cams required to perform the function of the invention.

In use, the combustion chamber 25 and piston 29 function in a conventional manner.

The inlet cam 24 functions in a conventional manner, and causes the inlet valve 20 to open to allow air to be drawn in during the intake stroke. The inlet valve 20 may be opened shortly before the piston 29 reaches TDC.

The inlet valve 20 is then closed to enable compression of the air within the combustion chamber 25. The inlet valve 20 may be closed after the piston 29 passes bottom dead centre, to allow compression during the compression stroke.

The inlet valve 20 then remains closed during the combustion stroke and exhaust stroke, opening again to allow air to be drawn in during the next intake stroke.

The No. 1 exhaust cam 13 functions unconventionally, and is characterised by the additional opening of the exhaust valve 16, which is opened during the compression stroke in addition to the exhaust stroke.

Conventional mechanisms would keep both the inlet valve 20 and exhaust valve 16 closed during the compression stroke, to enable maximum compression of the air before ignition.

Air being exhausted during the compression stroke would normally be considered detrimental to the invention, due to the lost compression.

One benefit of the air being expelled through the exhaust valve 16, before any fuel injection or ignition, during the compression stroke is that the exhaust valve 16 and ignition means 35 are cooled by the surplus air being exhausted.

Furthermore, any elements downstream of the exhaust valve 16 are then also cooled, notably this includes the exhaust system itself. The cooler exhaust provides performance and efficiency benefits, in addition to extending the life of the catalytic converter contained therein.

Importantly, the fuel injector 34 may inject a lower volume of fuel where the No. 2 exhaust cam 12 is configured to open the exhaust valve 16 during the compression stroke.

The No. 1 exhaust cam 13 may be configured to close the exhaust valve 16 at a desired point during the compression stroke.

The point at which the No. 1 exhaust cam 13 is configured to close the exhaust valve 16 may be selected to maintain a minimum volume of air to enable the engine 1 to idle without stalling.

The point during the compression stroke at which the exhaust valve 16 is closed may be selected to maintain a desired volume of air in the combustion chamber 25 for compression over the remaining portion of the compression stroke.

The volume of fuel injected may be selected electronically to be appropriate for the volume of air in the combustion chamber 25.

Alternatively, the duration for which the exhaust valve 16 is opened during the compression stroke may be selected to allow the engine 1 to provide sufficient power to cruise, for example at motorway speeds, without stalling.

The result of the combination of the reduced air volume and the reduced quantity of fuel injected is that the volume of the combustible charge in the combustion chamber 25 is smaller.

The result is an engine 1 having a combustion chamber 25 which displays characteristics of a combustion chamber 25 of much smaller volume when the exhaust valve 16 is allowed to open during the compression stroke.

The No. 2 exhaust cam 12 is configured to be optionally engaged in response to input from the operator.

The opening of the exhaust valve 16 during the compression stroke is a major departure from conventional combustion engines.

The input from the operator may be the requirement for additional power, in the form of the accelerator pedal being depressed.

The No. 2 exhaust cam 12 may be configured to keep the exhaust valve 16 closed during the compression cycle, and thus allow the piston 29 to complete the four strokes in a relatively conventional manner.

The unconventional profile of the No. 1 exhaust cam 13, and the optionally engaged No. 2 exhaust cam 12, allow the engine to perform conventionally, or to perform in a manner which displays the characteristics of a much smaller engine, and is thus more economical.

This is achieved by the expelling of some of the air during the compression stroke, and the corresponding reduced quantity of injected fuel.

The angle between the No. 1 exhaust cam 13 and the No. 2 exhaust cam 12 may be varied, so that the duration for which the exhaust valve 16 may be opened during the compression stroke may be varied.

The result of the angular variation is that the power of the engine may be adjusted according to demand.

Where no additional power is required, the No. 2 exhaust cam 12 is not engaged and the piston 29 functions under minimum operating conditions, with the volume of the air being compressed, and the quantity of fuel injected to combust with the air, being smaller than when operating with the No. 2 exhaust cam 12 engaged.

Where the piston 29 functions under minimum operating conditions, the fuel saving contributes to an increase in efficiency, where conventional engines would require sufficient fuel to be injected to combust with the large volume of air being compressed.

Furthermore, as a portion of the air drawn in to the combustion chamber 25 is expelled during the compression stroke, this air further cools the engine 1, and particularly the exhaust valve 16 and ignition means 35, and the downstream exhaust system.

The use of piston valves may provide further improvements in efficiency, by enabling improved valve cooling, which in turn results in lower likelihood of auto-ignition, which therefore allows for a higher compression ratio.

The compression ratio achieved by the engine 1 of the present invention may be in excess of 15:1.

The compression ratio achieved by the engine 1 of the present invention may be in excess of 18:1.

The inlet valve 20 is forced inwardly, against the bias, by the inlet cam 24, toward the closed position.

The closed position is reached where the inlet valve 20 is moved inwardly past the aperture forming the inlet port 26, which is therefore covered by the inlet valve 20. The gas seal may be effected by an angled valve seat at the most inward extent, the valve seat may be angled at 45 degrees.

As the inlet cam 24 turns to an open configuration, the inlet cam 24 allows the bias to move the inlet valve 20 outwardly, past the aperture forming the inlet port 26, which is therefore opened and unrestricted, providing a throat according to the size of the inlet port 26 to allow air to be drawn into the combustion chamber 25.

The use of the entire area of the inlet port 26 to draw air into the combustion chamber 25 is a major departure from conventional engines, in which butterfly or poppet valves are used. Both butterfly and poppet valves inhibit airflow even when in the open position, as a function of their construction.

The use of piston valves having a port in the wall of the sleeve 18,19 and head 10 enables greater airflow through an unrestricted port.

The corresponding arrangement is provided with regards to the exhaust valve 16, exhaust cams 12, 13 and exhaust port 27.

The inlet valve 20 and the exhaust valve 16 may be positioned so that, air drawn into the combustion chamber 25 via the inlet port 26 is directed toward the exhaust valve 16, which advantageously provides cooling to the exhaust valve 16.

The configuration of the inlet port 26 and the exhaust port 27 further enables the airflow entering the combustion chamber 25 to be directed toward and over the end of the exhaust valve 16, further providing advantageous cooling.

The inlet valve sleeve 19 may comprise an aperture in a wall of the inlet valve sleeve 19 to allow fluid flow between the inlet port 26 and the combustion chamber 25.

The aperture in the wall of the inlet valve sleeve 19 may be shaped to direct fluid flow from the inlet port 26 toward the exhaust valve 16.

The exhaust valve sleeve 18 may comprise an aperture in a wall of the exhaust valve sleeve 18 to allow fluid flow between the combustion chamber and the exhaust port 27.

The aperture in the wall of the exhaust valve sleeve 18 may be shaped to direct fluid flow from the combustion chamber toward the exhaust port 27.

The inlet valve sleeve 19 and exhaust valve sleeve 18 may both comprise dampers 40, 41, the dampers 40, 41 configured to restrict and slow down axial movement of the inlet valve sleeve 19 and exhaust valve sleeve 18 within the cylinder head 10.

The dampers 40, 41 may be retaining clips mounted within recesses in the walls of the inlet valve sleeve 19 and exhaust valve sleeve 18.

The dampers 40, 41 may be configured to be compressed to enable installation of the inlet valve sleeve 19 and exhaust valve sleeve 18 into the cylinder head 10, and to impart a radial force onto the cylinder head 10 once installed, to restrict and slow down movement of the inlet valve sleeve 19 and exhaust valve sleeve 18 within the cylinder head 10.

The dampers 40, 41 may also assist with restricting movement due to the differing thermal expansion of the cylinder head 10, inlet valve sleeve 19 and exhaust valve sleeve 18.

The dampers 40, 41 may be installed with the sleeves 18, 19 with a close fit, so that relative movement between the damper 40, 41 and sleeve 18, 19 is possible when a force is applied from within the combustion chamber.

The sleeves 18, 19 may be allowed to move axially to better effect the seal with the end of the valve 16, 20.

In the event that a sleeve 18, 19 moves outwardly of the combustion chamber 25, the action of the cams 24, 12, 13 will push the sleeve 18, 19 back into place. The dampers 40, 41 act to spread the load imparted by the cams 24, 12, 13 so that the sleeves 18, 19 are driven uniformly towards their preferred position.

The arrangement of the sleeves 18, 19 and dampers 40, 41 acts as a self-adjusting mechanism, keeping the sleeves 18, 19 in position in the cylinder head 10, and ensuring an adequate seal by making sure the valve always reaches its respective seat.

The inlet valve 20 and exhaust valve 16 may be positioned in an upper part of the combustion chamber 25, and may have axes which are oriented radially relative to the axis of the piston 29.

Conventional inwardly opening poppet valves are seated, or closed, at the outward extent of travel, which is advantageous as the force of the combustion imparts an outward force and therefore the seating of the valve is assisted by the combustion.

A problem of outwardly opening valves having axes of travel directed toward the combustion chamber is that force of the combustion acts to force the valves toward the open position, which must therefore be held closed by a suitable opposing force for efficient performance.

The present invention addresses this problem, as the force of the combustion acts to force the sleeve seat against the valve seat, forming a gas tight seal.

The radial orientation of the valves 16, 20 is advantageous because, as the axes of the valves 16, 20 are not aligned with their respective ports 27, 26, the fluid flow path to the port is not necessarily opened until the valve reaches a desired point in the cycle.

Consequently, if a valve 16, 20 is partially unseated due to the force of the combustion, pressure need not be lost where the port 27, 26 has not been exposed.

The distance between the end of the inlet valve 20 and the end of the exhaust valve 16 may be relatively small.

The distance between the end of the inlet valve 20 and the end of the exhaust valve 16 may be less than 50 mm.

The distance between the end of the inlet valve 20 and the end of the exhaust valve 16 may be less than 20 mm.

The distance between the end of the inlet valve 20 and the end of the exhaust valve 16 may be between 10 mm and 15 mm.

The close proximity of the opposed ends of the valves 16, 20 is advantageous when considering the airflow of the inlet air past the end of the exhaust piston valve 16.

As the valves 16, 20 are biased outwardly, the throat of the inlet port 26 and exhaust port 27 is at a maximum at the default position, and combustion energy is not lost to overcome the bias of the valve springs 21.

The valves may be biased using valve springs 21 housed within the valves 16, 20.

To retain the valve springs 21 in position at the outward end, a valve spring anchor 14 may be used.

In one embodiment, the valve spring anchor 14 takes the form of a Y, or a wishbone shape, to allow the outward end of the valve spring anchor 14 to be affixed to the cylinder head 10 whilst not impeding the operation of the cams.

To operate, the timing of the opening and closing of the valves 16, 20 is controlled by the arrangement of the cams 24, 12, 13.

The timing opens and closes the valves 16, 20 at various points during the combustion cycle, which consists of four strokes, the intake, compression, combustion and exhaust strokes.

The timing may be such that the inlet valve 20 is opened for the intake stroke of the engine, and remains closed during the compression, combustion and exhaust strokes.

The exhaust piston valve 16 may be closed for the intake and combustion strokes, and open for the compression and exhaust strokes.

The exhaust piston valve 16 may be closed for some or all of the compression stroke.

During the intake stroke the air is drawn into the combustion chamber 25 through the entire throat of the inlet port 26, and passes over the exhaust valve 16, reducing the temperature of the exhaust valve 16 and downstream exhaust system.

At the beginning of the compression stroke, the inlet valve 20 may be closed, and the exhaust valve 16 may be opened according to the power demand.

Alternatively, the exhaust valve 16 may be opened at some stage during the compression stroke, allowing for a portion of the cool inlet air to be passed through the exhaust port 27 after the end of the intake stroke and during the first part of the compression stroke if required for low power outputs. This may be done to cool both the exhaust port 27 and the exhaust valve 16.

The point at which the exhaust valve 16 is opened may vary depending on the power requirements, as opening the valve 16 for a shorter time, or keeping the valve 16 closed for the entire compression stroke, results in a greater volume of charge being available for combustion, but a reduced volume of cooling air passing through the exhaust port 27.

When the engine 1 is idling, with the only load being internal friction of the engine itself, most of the total air induced during the intake stroke may be expelled from the combustion chamber 25, after the inlet valve 20 has closed, through the exhaust port 27, and a small amount of fuel injected through the injector 34 at the optimum time. This allows for improved efficiency due to both the reduced fuel consumption and lower temperature.

When larger power values are required (i.e. for accelerating a vehicle from rest), the exhaust valve 16 may be kept in the closed position for longer, which will prevent a portion of initially drawn-in air from escaping before or after top-dead-centre, and a maximum amount of combustible charge will be retained for combustion in order to produce the required amount of power.

This variation in the time at which the exhaust valve 16 may be opened is achieved by using two exhaust cams 12, 13. Defined as No. 1 exhaust cam 13 and No. 2 exhaust cam 12.

The No. 1 exhaust cam 13 operates continuously, and is timed to open the exhaust valve 16 for a substantial portion of the compression stroke, thus allowing greater quantities of cooling air to pass through, and requiring minimal injection of fuel.

The No. 2 exhaust cam 12 is configured to keep the exhaust valve 16 closed for a greater portion of the compression cycle, thus allowing a greater volume of combustible charge, and therefore more power.

The No. 2 exhaust cam 12 may be controlled to allow a quantity of relatively cold air to escape through the exhaust port 27 once in every cycle of the running engine keeping the exhaust valve 16 and exhaust port 27 much cooler for its entire life. The exhaust port 27 feeds air through the rest of the exhaust system, which also benefits from being kept cool.

Control of the No. 2 exhaust cam 12 may be achieved by a second control shaft 8 running parallel to the main exhaust camshaft 4. In this embodiment a power-control-drive-gear 6 is keyed to the control shaft 8 and engages with a corresponding power-control-driven-gear 7 which is keyed to No. 2 exhaust cam 12, mounted on the main exhaust camshaft 4. No. 2 exhaust cam 12 is allowed to rotate freely on the main exhaust camshaft 4.

The control shaft 8 may be rotated in strict continuous relationship with the main exhaust camshaft 4 through, a pair of meshing control gears, a power-control-driven-gear 7 keyed to the front end of the control shaft 8, and the power-control-drive-gear 6 running freely on the front end of the main exhaust camshaft 4. Although running freely, the power-control-drive-gear 6 is controlled by the ball bearings therein, and the helical grooves on the exhaust camshaft 4.

The power-control-drive-gear 6, mounted on the front end of the main exhaust camshaft 4, may be actuated a nominal distance by moving the control lever 33 axially along the main exhaust camshaft 4.

The end of the main exhaust camshaft 4 may have three helical grooves, each groove containing a suitably sized ball bearings. The ball bearings may be caged inside the bore of the power-control-drive-gear 6 and engage with the helical grooves in the end of the main exhaust camshaft 4.

By moving the power-control-drive-gear 6 along the axis of the main exhaust camshaft 4, the power-control-drive-gear 6 rotates the gear relative to the main exhaust camshaft 4, a desired amount, either in advance or behind the set timing of the main exhaust camshaft 4. A nominal selector arm (as used in a conventional gear box) is used to move the power-control-drive-gear 6, seamlessly axially.

The amount of power exerted by the crankshaft is controlled by the No. 2 exhaust cam 12. It allows excess air that has already been drawn in during the intake stroke to be exhaled through the exhaust port 27 after the end of the intake stroke and during the first part of the compression stroke if required for low power outputs.

The use of piston type valves for the inlet valve 20 and the exhaust valve 16 allows for increased airflow both in and out of the combustion chamber 25 which, combined with the design and configuration of the valves, allows for higher compression ratios.

Where higher compression ratios are used, the risk of auto-ignition increases, and where components are at high temperatures, this risk is further exacerbated.

The exhaust valve 16 could be considered to have a high operating temperature, which is alleviated by the flow of relatively cool inlet air being directed to the end of the exhaust valve 16. This reduces the risk of auto-ignition due to temperature, and therefore assists with the enablement of high compression ratios.

The configuration of the two exhaust cams 12, 13 allows for additional cooling air to be supplied to the system when idling, but for additional power to be available when required.

Modifications and variations as would be apparent to a skilled addressee are deemed to be within the scope of the present invention.

The invention claimed is:

1. A four-stroke internal combustion engine, comprising: a combustion chamber;
a piston mounted within the combustion chamber and configured to be sealingly engaged with walls of the combustion chamber, the piston being arranged for reciprocating motion along an axis between a first position in which the combustion chamber is of maximum volume and a second position in which the combustion chamber is of minimum volume;
wherein the piston completes four strokes during a cycle, the strokes defined as intake stroke, compression stroke, combustion stroke and exhaust stroke;
a fuel injection means in a region of the combustion chamber within the minimum volume defined by the piston in its second position; a cylinder head comprising an ignition means;
an inlet cam configured to open and close an inlet valve;
a No. 1 exhaust cam configured to open and close an exhaust valve;
a No. 2 exhaust cam configured to open and close the exhaust valve that is configured to be opened and closed by the No. 1 exhaust cam; and
wherein the No. 2 exhaust cam is angularly adjustable relative to the No. 1 exhaust cam in response to input from an operator, so that the No. 2 exhaust cam is able to be selectively engaged, wherein the No. 1 exhaust cam is configured to open and close the exhaust valve during the compression stroke, so that a selected quantity of air drawn in during the intake stroke is expelled during the compression stroke;
wherein the No. 2 exhaust cam is configured to optionally close the exhaust valve when engaged; and
wherein the fuel injection means is configured to adjust a quantity of fuel injected in accordance with the quantity of air retained during the compression stroke.

2. A four-stroke internal combustion engine according to claim 1, wherein;
the inlet cam is keyed to an inlet cam shaft;
the No. 1 exhaust cam is keyed to an exhaust cam shaft; and
the No. 2 exhaust cam is rotatable around the axis of the exhaust cam shaft.

3. A four-stroke internal combustion engine according to claim 1, wherein the inlet valve and exhaust valve are piston valves.

4. A four-stroke internal combustion engine according to claim 1, wherein the engine comprises a No. 2 exhaust-cam-drive-gear keyed to a control shaft, and the No. 2 exhaust-cam-drive-gear engages with a No. 2 exhaust-cam-driven-gear keyed to the No. 2 exhaust cam.

5. A four-stroke internal combustion engine according to claim 4, wherein the engine further comprises a power-control-drive-gear having an axis parallel to, and coincident with, the exhaust cam shaft, and configured to engage with a power control driven gear wheel keyed to the control shaft; wherein the power-control-drive-gear is moveable along its axis in response to input from an operator.

6. A four-stroke internal combustion engine according to claim 5, wherein angular adjustment of the No. 2 exhaust cam relative to the No. 1 exhaust cam is achieved using an angular adjustment mechanism, configured to enable angular adjustment of the power-control-drive-gear in relation to the main exhaust cam shaft, upon axial movement of the power control drive gear; wherein axial movement of the power-control-drive-gear results in angular adjustment of the No. 1 exhaust cam relative to the No. 2 exhaust cam, so that the duration for which the exhaust piston valve remains open or closed may be adjusted in accordance with input from the operator.

7. A four-stroke internal combustion engine according to claim 6, wherein the angular adjustment mechanism comprises helical grooves engaging with caged ball bearings.

8. A four-stroke internal combustion engine according to claim 1, wherein the inlet valve is configured to sealingly engage with an inlet valve sleeve and the exhaust valve is configured to sealingly engage with an exhaust valve sleeve.

9. A four-stroke internal combustion engine according to claim 8, the inlet valve sleeve and exhaust valve sleeve both comprise engagement features, the engagement features configured to control axial movement of the inlet valve sleeve and exhaust valve sleeve within the cylinder head.

10. A four-stroke internal combustion engine according to claim 9, wherein the engagement features comprise dampers mounted within recesses in the walls of the inlet valve sleeve and exhaust valve sleeve; wherein the dampers are configured to be compressed to enable installation of the inlet valve sleeve and exhaust valve sleeve into the cylinder head, and to impart a radial force onto the cylinder head once installed, to control movement of the inlet valve sleeve and exhaust valve sleeve within the cylinder head.

11. A four-stroke internal combustion engine according to claim 1, wherein the inlet valve is arranged to provide a fluid flow path from an inlet port to the combustion chamber when in the open position; and is arranged to cover the inlet port, thus preventing flow, when in the closed position; and the exhaust valve is arranged to provide a fluid flow path from an exhaust port to the combustion chamber when in the open position; and is arranged to cover the exhaust port, thus preventing flow, when in the closed position.

12. A four-stroke internal combustion engine according to claim 1, wherein the inlet valve and the exhaust valve are biased toward their respective open positions.

13. A four-stroke internal combustion engine according to claim 1, wherein the inlet valve and the exhaust valve are each biased using a valve spring.

14. A four-stroke internal combustion engine according to claim 13, wherein the valve spring is located inside the valve.

15. A four-stroke internal combustion engine according to claim 13, wherein the valve spring is retained using a valve spring anchor.

16. A four-stroke internal combustion engine according to claim 15, wherein the valve spring anchor is a Y or wishbone shape, so that the anchoring of the valve spring does not impede the cams and cam shafts.

17. A four-stroke internal combustion engine according to claim 1, wherein the inlet port is arranged to direct airflow toward the exhaust valve when in the open position, so that the exhaust valve is cooled by air entering the inlet port.

18. A four-stroke internal combustion engine according to claim 17, wherein the inlet valve sleeve comprises an aperture in a wall of the inlet valve sleeve to allow fluid flow between the combustion chamber and the inlet port.

19. A four-stroke internal combustion engine according to claim 18, wherein the aperture in the wall of the inlet valve sleeve is shaped to direct fluid flow from the inlet port toward the exhaust piston valve.

20. A four-stroke internal combustion engine according to claim 1, wherein the inlet valve and exhaust valve are disposed opposite each other and have a radial direction of movement with respect to the axis of the piston.

* * * * *